United States Patent
Ikeda

(10) Patent No.: US 9,367,752 B2
(45) Date of Patent: Jun. 14, 2016

(54) CAMERA POSITION POSTURE EVALUATING DEVICE, CAMERA POSITION POSTURE EVALUATING METHOD, AND CAMERA POSITION POSTURE EVALUATING PROGRAM

(71) Applicant: NEC Corporation, Tokyo (JP)

(72) Inventor: Hiroo Ikeda, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 14/410,236

(22) PCT Filed: Jun. 6, 2013

(86) PCT No.: PCT/JP2013/003572
§ 371 (c)(1),
(2) Date: Dec. 22, 2014

(87) PCT Pub. No.: WO2014/002398
PCT Pub. Date: Jan. 3, 2014

(65) Prior Publication Data
US 2015/0339537 A1    Nov. 26, 2015

(30) Foreign Application Priority Data

Jun. 28, 2012 (JP) ................. 2012-145433

(51) Int. Cl.
| | |
|---|---|
| *G06K 9/00* | (2006.01) |
| *G06K 9/32* | (2006.01) |
| *H04N 5/232* | (2006.01) |
| *H04N 17/02* | (2006.01) |
| *G06T 7/00* | (2006.01) |
| *H04N 5/225* | (2006.01) |

(52) U.S. Cl.
CPC .......... *G06K 9/3241* (2013.01); *G06K 9/00771* (2013.01); *G06T 7/0028* (2013.01);
(Continued)

(58) Field of Classification Search
CPC ............... G06K 9/00; H04N 5/00; G06T 7/00
USPC .......... 382/103, 107, 236; 348/159, 169, 170, 348/171, 172, 352
See application file for complete search history.

(56) References Cited

U.S. PATENT DOCUMENTS

| | | | |
|---|---|---|---|
| 6,792,370 B2* | 9/2004 | Satoh | ................ G06T 7/0018 345/419 |
| 7,924,311 B2* | 4/2011 | Yoshida | ........... G08B 13/19641 348/143 |

(Continued)

FOREIGN PATENT DOCUMENTS

| | | |
|---|---|---|
| CN | 101971621 A | 2/2011 |
| JP | 2001-256591 | 9/2001 |

(Continued)

OTHER PUBLICATIONS

R.Y. Tsai, "A Versatile Camera Calibration Technique for High-Accuracy 3D Machine Vision Metrology Using Off-the-Shelf TV Cameras and Lenses", IEEE Journal of Robotics and Automation, vol. RA-3, No. 4, pp. 323-344, Aug. 1987.

(Continued)

*Primary Examiner* — Abolfazl Tabatabai
(74) *Attorney, Agent, or Firm* — Finnegan, Henderson, Farabow, Garrett & Dunner LLP

(57) ABSTRACT

There is provided a camera position posture evaluating device which can calculate a value which indicates an evaluation of a state of a camera from a viewpoint of to what degree an object appears in an image suitably for image processing. A resolution evaluating means 71 calculates a first suitability rate matching each position in a target area from a viewpoint of resolution. A gazing point angle evaluating means 72 calculates a second suitability rate matching each position in the target area. A target area evaluating means 73 calculates a third suitability rate from a viewpoint of how a target object field-of-view area and the target area overlap. A comprehensive evaluating means 74 calculates an evaluation index which indicates to what degree the state of the camera is suitable to the image processing based on the first suitability rate matching each position in the target area, the second suitability rate matching each position in the target area and the third suitability rate.

9 Claims, 22 Drawing Sheets

(52) U.S. Cl.
CPC .......... *H04N 5/232* (2013.01); *H04N 5/23219* (2013.01); *H04N 5/23222* (2013.01); *H04N 17/02* (2013.01); *G06T 2207/30196* (2013.01); *G06T 2207/30232* (2013.01); *G06T 2207/30244* (2013.01)

(56) References Cited

U.S. PATENT DOCUMENTS

| | | |
|---|---|---|
| 2004/0233288 A1 | 11/2004 | Hytten et al. |
| 2005/0128291 A1 | 6/2005 | Murakami |
| 2012/0057852 A1 | 3/2012 | Devleeschouwer et al. |

FOREIGN PATENT DOCUMENTS

| | | |
|---|---|---|
| JP | 2002-118788 | 4/2002 |
| JP | 2004-333872 | 11/2004 |
| JP | 2005-260731 | 9/2005 |
| JP | 2008-070267 | 3/2008 |
| JP | 2009-086932 | 4/2009 |
| JP | 2009-246935 | 10/2009 |
| TW | 200528945 | 9/2005 |
| TW | 201205501 A1 | 2/2012 |

OTHER PUBLICATIONS

International Search Report and Written Opinion of ISA mailed Jul. 30, 2013.
Extended European Search Report mailed on Aug. 18, 2015 by the European Patent Office in counterpart European Patent Application No. 13809606.0.
Office Action mailed on Aug. 20, 2015 by the Taiwanese Patent Office in counterpart Taiwanese Patent Application No. 102122195.
Office Action mailed on Nov. 4, 2015, by the Chinese Patent Office in counterpart Chinese Patent Application No. 201380012264.2.

* cited by examiner

EXAMPLE OF PROJECTED TARGET OBJECT MODEL FITTING IN IMAGE

EXAMPLE OF PART OF PROJECTED TARGET OBJECT MODEL PROTRUDING OUTSIDE IMAGE

CAMERA POSITION POSTURE EVALUATING DEVICE, CAMERA POSITION POSTURE EVALUATING METHOD, AND CAMERA POSITION POSTURE EVALUATING PROGRAM

CROSS-REFERENCE TO RELATED PATENT APPLICATIONS

This application is a National Stage Entry of International Application No, PCT/JP2013/003572, filed Jun. 6, 2013, which claims priority from Japanese Patent Application No. 2012-145433, filed Jun. 28, 2012. The entire contents of the above-referenced applications are expressly incorporated herein by reference.

TECHNICAL FIELD

The present invention relates to a camera position posture evaluating device, a camera position posture evaluating method and a camera position posture evaluating program and, more particularly, relates to a camera position posture evaluating device, a camera position posture evaluating method and a camera position posture evaluating program which calculate a value indicating an evaluation of a state of a camera.

BACKGROUND ART

Patent Literature 1 discloses a camera selecting device which selects a camera which has a field of view similar to a field of view of a viewer from a plurality of cameras. The device disclosed in Patent Literature 1 evaluates a relationship between positions and directions of point of views of the viewer and the camera, and selects a camera which has a field of view similar to the field of view of the viewer. More specifically, the device disclosed in Patent Literature 1 calculates an area of a triangle formed by a viewer's position P, a camera position and a point of view Q, and an angle formed between an optical axis center vector of the camera and a vector PQ. Further, the device disclosed in Patent Literature 1 selects a camera which has a field of view similar to the field of view of a viewer based on evaluation values of the area and the angle.

Furthermore, Patent Literature 2 discloses a position posture measuring method of calculating a position and a posture of one of two cameras using images captured by the two cameras of different resolutions.

Still further, Non Patent Literature 1 discloses a technique of calculating camera parameters based on an image obtained by a camera.

CITATION LIST

Patent Literature

PLT 1: JP-A-2005-260731 (for example, paragraphs [0020] and [0021], and FIG. 2)

PLT 2: JP-A-2008-70267 (for example, paragraphs [0025] and [0099] and FIGS. 1 and 3)

Non-Patent Literature

NPL 1: Roger Y. TSAI, "A Versatile Camera Calibration Technique for High-Accuracy 3D Machine Vision Metrology Using Off-the-Shelf TV Cameras and Lenses", IEEE JOURNAL OF ROBOTICS AND AUTOMATION, VOL. RA-3, NO. 4 Aug. 1987, pp. 323-344

SUMMARY OF INVENTION

Technical Problem

An object of the device disclosed in Patent Literature 1 is to select a camera which has a field of view similar to a field of view of a viewer. Hence, the device disclosed in Patent Literature 1 calculates an evaluation value indicating similarity between the field of view of the camera and the field of view of the viewer.

However, when a camera captures an image of an object which exists in an image capture target area, it is preferable in some cases to adjust the position and the posture of the camera such that this object appears in an image suitably to image processing. In these cases, from a viewpoint of to what degree the object appears in the image suitably to image processing, it is preferable to calculate an evaluation value to what degree a camera state including the position and the posture is preferable. The image processing includes, for example, detection processing of detecting an object in an image and identification processing of not only detecting an object in an image and identifying the object. However, the image processing is by no means limited to these examples.

For example, the area of the triangle disclosed in Patent Literature 1 is an evaluation value which represents similarity between the field of view of the viewer and the field of view of the camera, and therefore is not appropriate as a value which indicates an evaluation of the camera state from a viewpoint of to what degree an object appears in an image suitably to image processing.

Therefore, an object of the present invention is to provide a camera position posture evaluating device, a camera position posture evaluating method and a camera position posture evaluating program which can calculate a value indicating an evaluation of a state of a camera from a viewpoint of to what degree an object appears in an image suitably to image processing.

Solution to Problem

A camera position posture evaluating device according to the present invention has: at least one of a resolution evaluating means which evaluates resolution of a target object in an image obtained by capturing the image of the target object arranged at each position in a target area, according to a resolution evaluation function which defines a relationship between the resolution and a first suitability rate which indicates suitability of image processing, and thereby derives the first suitability rate matching each position in the target area, and a gazing point angle evaluating means which evaluates a gazing point angle which is an angle formed between a straight line which passes on a gazing point in the target object arranged at each position in the target area and a position of a camera, and a ground according to a gazing point angle evaluation function which defines a relationship between the gazing point angle and a second suitability rate which indicates suitability of the image processing, and thereby derives the second suitability rate matching each position in the target area; a target area evaluating means which derives a third suitability rate which is determined based on to what degree a target object field-of-view area which is a collection of positions which are positions on the ground in real space which meet pixel positions in the image and in which the entirety of the target object fits in the image when the target object is arranged at the positions, and the target area accurately overlap, and which indicates the suitability of the image processing; and a comprehensive evaluating means which, based on at least one of the first suitability rate matching each position in the target area and the second suitability rate matching each position in the target area, and the third suitability rate, derives an evaluation index which indicates to what degree a state of the camera is suitable to the image processing.

Further, a camera position posture evaluating device according to the present invention has a resolution evaluating means which is given resolution of a target object in an image acquired from the image obtained by capturing the image of the target object arranged at each position in a target area and information which indicates whether or not entirety of the target object fits in the image, evaluates the resolution according to a resolution evaluation function which defines a relationship between the resolution and a suitability rate which indicates suitability of image processing, and thereby derives the suitability rate matching each position in the target area, and the resolution evaluating means sets 1 to a value of a coefficient to multiply on a result obtained by evaluating the resolution according to the resolution evaluation function when the entirety of the target object fits in the image, sets a value equal to or more than 0 and less than 1 to the value of the coefficient when part of the target object does not fit in the image and multiplies with the coefficient the result obtained by evaluating the resolution according to the resolution evaluation function, and thereby derives the suitability rate.

Furthermore, a camera position posture evaluating method according to the present invention includes: at least one of a resolution evaluating step of evaluating resolution of a target object in an image obtained by capturing the image of the target object arranged at each position in a target area, according to a resolution evaluation function which defines a relationship between the resolution and a first suitability rate which indicates suitability of image processing, and thereby deriving the first suitability rate matching each position in the target area, and a gazing point angle evaluating step of evaluating a gazing point angle which is an angle formed between a straight line which passes on a gazing point in the target object arranged at each position in the target area and a position of a camera, and a ground according to a gazing point angle evaluation function which defines a relationship between the gazing point angle and a second suitability rate which indicates suitability of the image processing, and thereby deriving the second suitability rate matching each position in the target area; a target area evaluating step of deriving a third suitability rate which is determined based on to what degree a target object field-of-view area which is a collection of positions which are positions on the ground in real space which meet pixel positions in the image and in which the entirety of the target object fits in the image when the target object is arranged at the positions, and the target area accurately overlap, and which indicates the suitability of the image processing; and a comprehensive evaluating step of, based on at least one of the first suitability rate matching each position in the target area and the second suitability rate matching each position in the target area, and the third suitability rate, deriving an evaluation index which indicates to what degree a state of the camera is suitable to the image processing.

Still further, a camera position posture evaluating program according to the present invention causes a computer to execute: at least one of resolution evaluation processing of evaluating resolution of a target object in an image obtained by capturing the image of the target object arranged at each position in a target area, according to a resolution evaluation function which defines a relationship between the resolution and a first suitability rate which indicates suitability of image processing, and thereby deriving the first suitability rate matching each position in the target area, and gazing point angle evaluation processing of evaluating a gazing point angle which is an angle formed between a straight line which passes on a gazing point in the target object arranged at each position in the target area and a position of a camera, and a ground according to a gazing point angle evaluation function which defines a relationship between the gazing point angle and a second suitability rate which indicates suitability of the image processing, and thereby deriving the second suitability rate matching each position in the target area; target area evaluation processing of deriving a third suitability rate which is determined based on to what degree a target object field-of-view area which is a collection of positions which are positions on the ground in real space which meet pixel positions in the image and in which the entirety of the target object fits in the image when the target object is arranged at the positions, and the target area accurately overlap, and which indicates the suitability of the image processing; and comprehensive evaluation processing of, based on at least one of the first suitability rate matching each position in the target area and the second suitability rate matching each position in the target area, and the third suitability rate, deriving an evaluation index which indicates to what degree a state of the camera is suitable to the image processing.

Advantageous Effects of Invention

The present invention can calculate a value indicating an evaluation of a state of a camera from a viewpoint of to what degree an object appears in an image suitably to image processing.

DESCRIPTION OF EMBODIMENTS

Hereinafter, exemplary embodiments of the present invention will be described with reference to the drawings.

First Exemplary Embodiment

Figure 1:
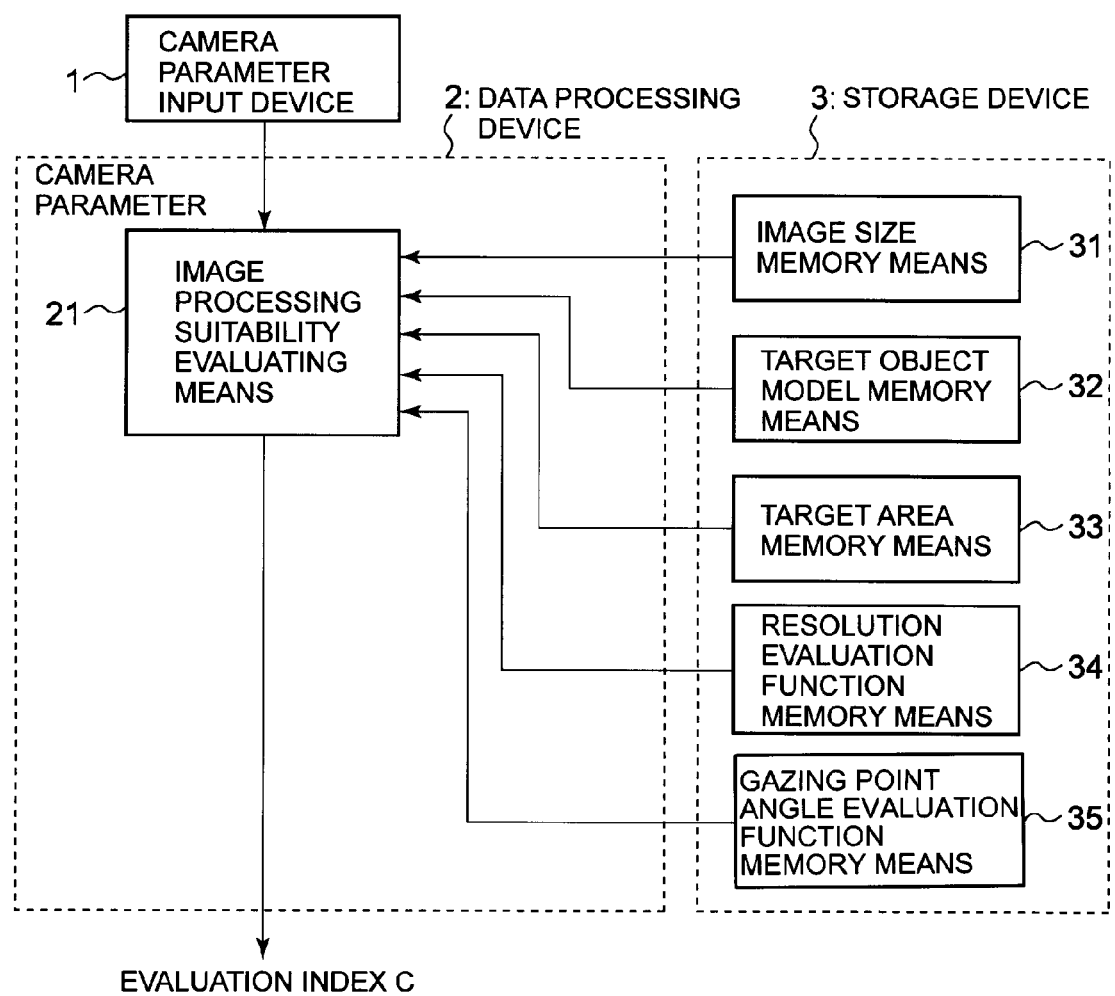
FIG. 1 It depicts a block diagram illustrating a configuration example of a camera position posture evaluating device according to a first exemplary embodiment of the present invention.

FIG. 1 depicts a block diagram illustrating a configuration example of a camera position posture evaluating device according to a first exemplary embodiment of the present invention. The camera position posture evaluating device according to the present exemplary embodiment has a camera parameter input device 1, a data processing device 2 and a storage device 3. The data processing device 2 is, for example, a computer which operates under control of a program. The data processing device 2 includes an image processing suitability evaluating means 21.

The camera position posture evaluating device according to the present exemplary embodiment receives an input of a current state of a camera (camera parameters) as data, evaluates suitability of image processing in an image for each position of a target area, and calculates an evaluation index which indicates to what degree the camera state is suitable to the image processing based on a value (referred to as a "suitability rate") which indicates this suitability. As described above, the image processing includes, for example, detection processing of detecting an object in an image and identification processing of not only detecting an object in an image and identifying the object. However, the image processing is by no means limited to these examples.

Figure 2:
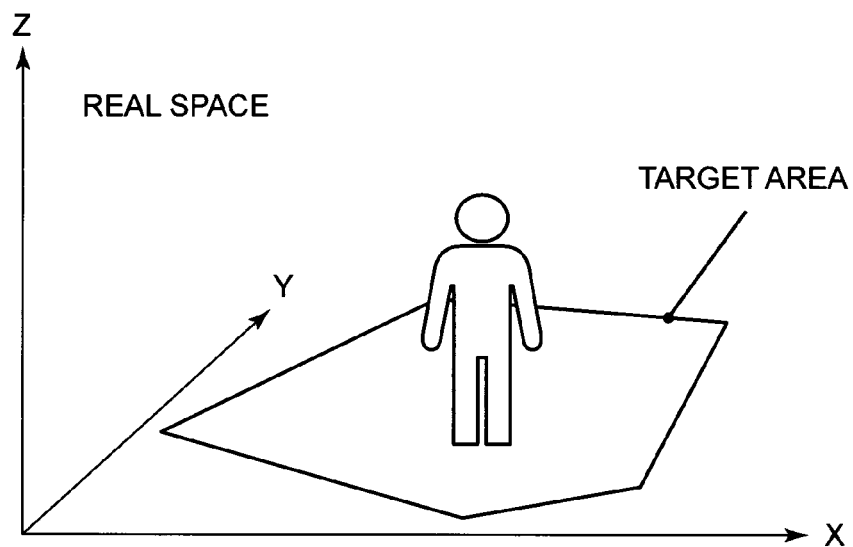
FIG. 2 It depicts a schematic view illustrating a target area.

Meanwhile, the target area refers to a range in real space an image of which is captured by a camera and which is an image processing target in an image obtained as result of image capturing. FIG. 2 depicts a schematic view illustrating a target area. When, for example, surveillance is performed using an image captured by a camera, a surveillance area in real space corresponds to the target area.

The camera parameter input device 1 supplies camera parameters which indicate a camera state to the data processing device 2 (image processing suitability evaluating means 21). These camera parameters include internal parameters which indicate, for example, a focal distance of the camera, a lens distortion coefficient and an image center position, and external parameters which indicate a position and a posture of the camera. Further, the camera parameters are also parameters which can convert a two-dimensional coordinate of an image coordinate system and a three-dimensional coordinate of a world coordinate system to and from each other.

The camera parameter values supplied by the camera parameter input device 1 may be values derived by a known method (for example, a method disclosed in Non Patent Literature 1) based on an image which needs to be evaluated and is obtained by the camera. Further, by creating an image to be obtained by a camera virtually by CG (Computer Graphics), the camera parameter values may be derived based on this CG image. Alternatively, the camera parameter input device 1 may supply manually set camera parameter values. This is an example of a method of deriving camera parameter values, and a method of deriving camera parameters supplied by the camera parameter input device 1 is not limited in particular.

The storage device 3 includes an image size memory means 31, a target object model memory means 32, a target area memory means 33, a resolution evaluation function memory means 34 and a gazing point angle evaluation function memory means 35.

The image size memory means 31 stores an image size of the camera a state of which needs to be evaluated. More specifically, the image size memory means 31 stores the number of pixels which represents a vertical size of an image and the number of pixels which represents a horizontal size.

The target object model memory means 32 stores data which represents a shape and a size of an object (referred to as an "target object" below) which is an image processing target in an image captured by the camera and obtained as a result of image capturing. The target object represented by this data is also referred to as a target object model below in some cases. When, for example, an image captured by the camera is used to detect a face and recognize the face, the target object model memory means 32 stores data which represents, for example, the shape of the face, the size and a height from the ground. The shape of the target object may be represented by an approximate shape such as a cylindrical shape, a cuboid shape or a stick shape.

The target area memory means 33 stores a target area. That is, the target area memory means 33 stores a range (see FIG. 2) in real space which is an image processing target in an image captured by the camera and obtained as a result of image capturing. Further, the target area memory means 33 also stores an area of a target area.

Figure 3:
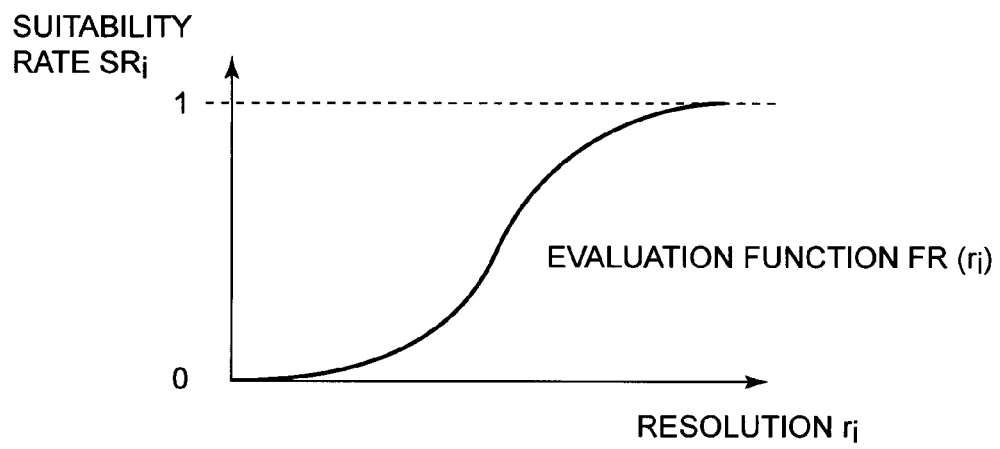
FIG. 3 It depicts a graph illustrating an example of a resolution evaluation function.

The resolution evaluation function memory means 34 stores an evaluation function (referred to as a "resolution evaluation function" below) of transforming resolution of a target object in an image into a suitability rate which represents suitability of image processing. FIG. 3 depicts a graph illustrating an example of a resolution evaluation function. When resolution is more suitable to image processing, the suitability rate is closer to 1, and, when resolution is less suitable to image processing, the suitability rate is closer to 0. Generally, when resolution is higher, a target object is clearer and is more suitable to image processing. The resolution evaluation function is set according to resolution of performance limit of image processing to be performed. The resolution described herein may be, for example, a pixel area of a target object in an image or a rectangular pixel area which surrounds a target object in an image. Alternatively, the resolution may be a pixel size in a vertical direction of the rectangular area or a pixel size in a horizontal direction of this rectangular area. By using the resolution evaluation function, it is possible to transform resolution obtained from a target object in an image into a suitability rate which represents suitability of image processing.

Figure 4:
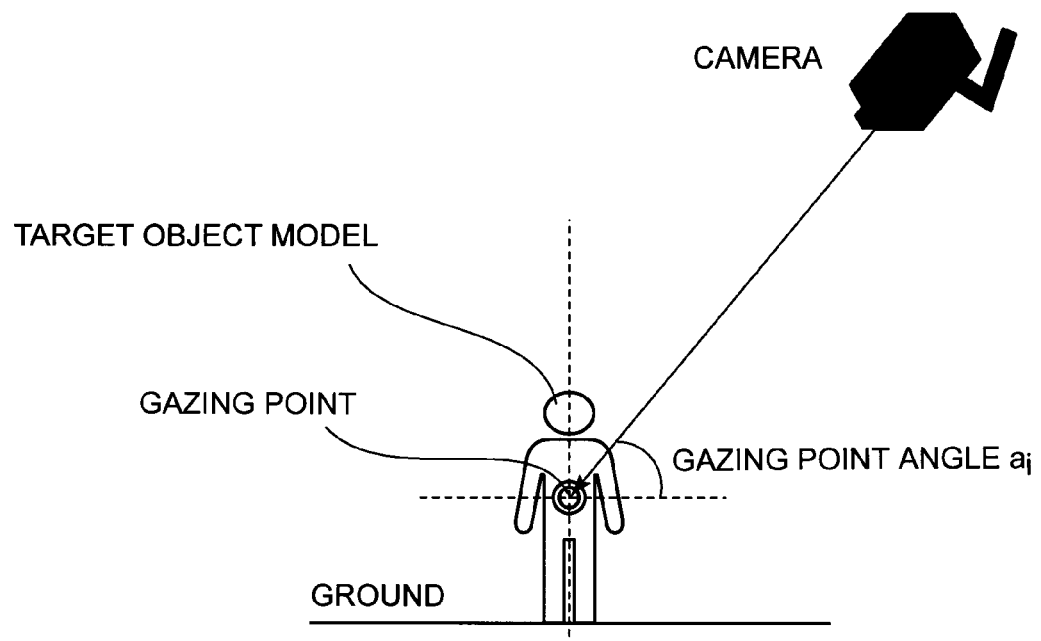
FIG. 4 It depicts an explanatory view illustrating a gazing point angle with respect to a target object.

The gazing point angle evaluation function memory means 35 stores an evaluation function (referred to as a "gazing point angle evaluation function" below) of transforming a gazing point angle with respect to a target object into a suitability rate which represents suitability of image processing. FIG. 4 depicts an explanatory view illustrating a gazing point angle with respect to a target object. FIG. 4 illustrates that a target object model is a person. The gazing point angle with respect to the target object is an angle formed between a straight line which connects a camera position and a gazing point position in the target object, and a ground. Meanwhile, the gazing point position in the target object is an arbitrary point in the target object which represents a position of the target object which needs to be focused upon. For example, a gravity point of the target object and a center of a center axis may be the gazing point position. In addition, although FIG. 4 illustrates a case where a camera is oriented in a direction of a target object, the orientation of the camera does not matter. That is, when the camera position and the gazing point position in the target object are determined, the gazing point angle is determined irrespectively of the orientation of the camera.

Figure 5:
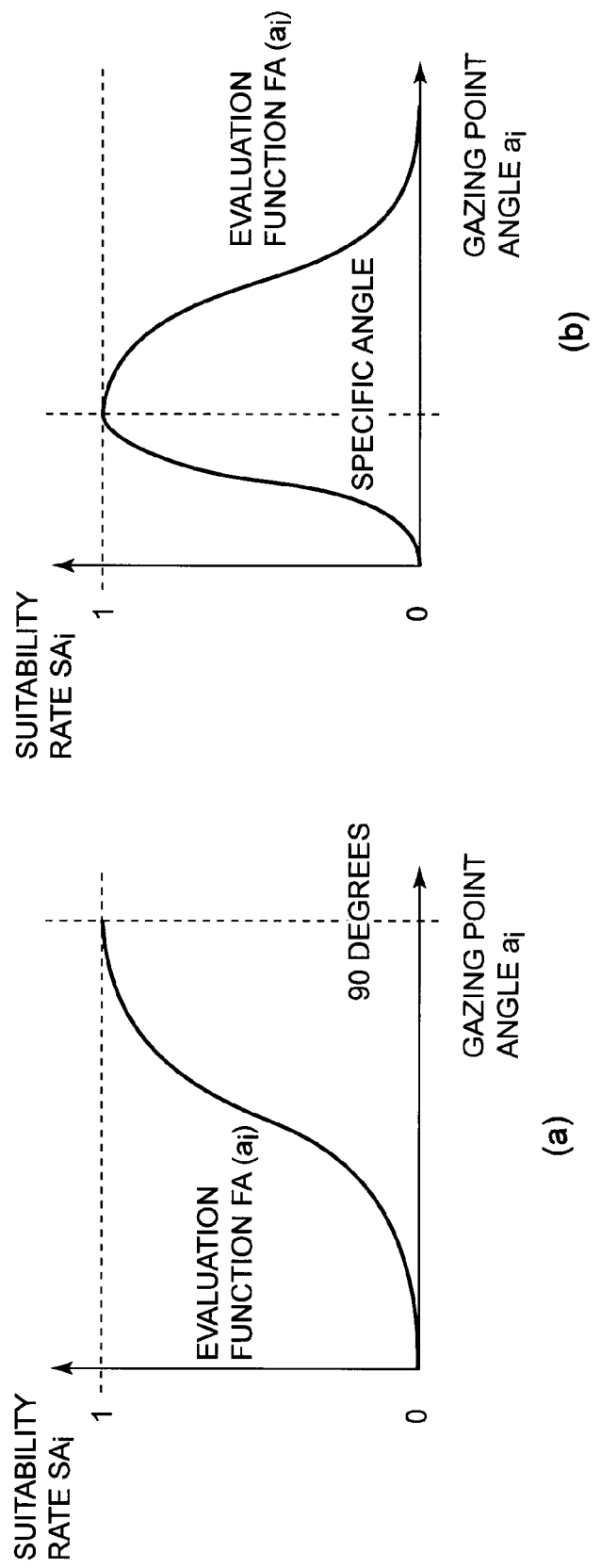
FIG. 5 It depicts a graph illustrating an example of a gazing point angle evaluation function.

FIG. 5 depicts a graph illustrating an example of a gazing point angle evaluation function. When, for example, image processing is processing of estimating a position of a target object, preferably, target objects overlap less or a target object and an obstacle overlap less. In this case, as illustrated in FIG. 5(a), a gazing point angle evaluation function only needs to be determined such that, when the gazing point angle is closer to 90 degrees (that is, an image capturing position is closer to a right angle), the suitability rate is closer to 1, and, when the gazing point angle is closer to 0 degree, the suitability rate is closer to 0. Further, when, for example, image processing is object detection and object recognition, the gazing point angle is preferably closer to a specific angle. In this case, as illustrated in FIG. 5(b), the gazing point angle evaluation function only needs to be determined such that, when the gazing point angle is closer to a specific angle, the suitability rate is higher.

An example will be described with each exemplary embodiment where the gazing point angle evaluation function and suitability rates calculated according to the gazing point angle evaluation function are in a range of 0 to 1.

The image processing suitability evaluating means 21 receives an input of camera parameters (internal parameters which indicate, for example, a focal distance of the camera, a lens distortion coefficient and an image center position, and external parameters which indicate a position and a posture of the camera) which represent a camera state from the camera parameter input device 1. Further, the image processing suitability evaluating means 21 calculates an evaluation index which indicates to what degree the camera state is suitable to image processing from viewpoints of resolution, a gazing point angle and how a target area looks in an image.

Figure 6:
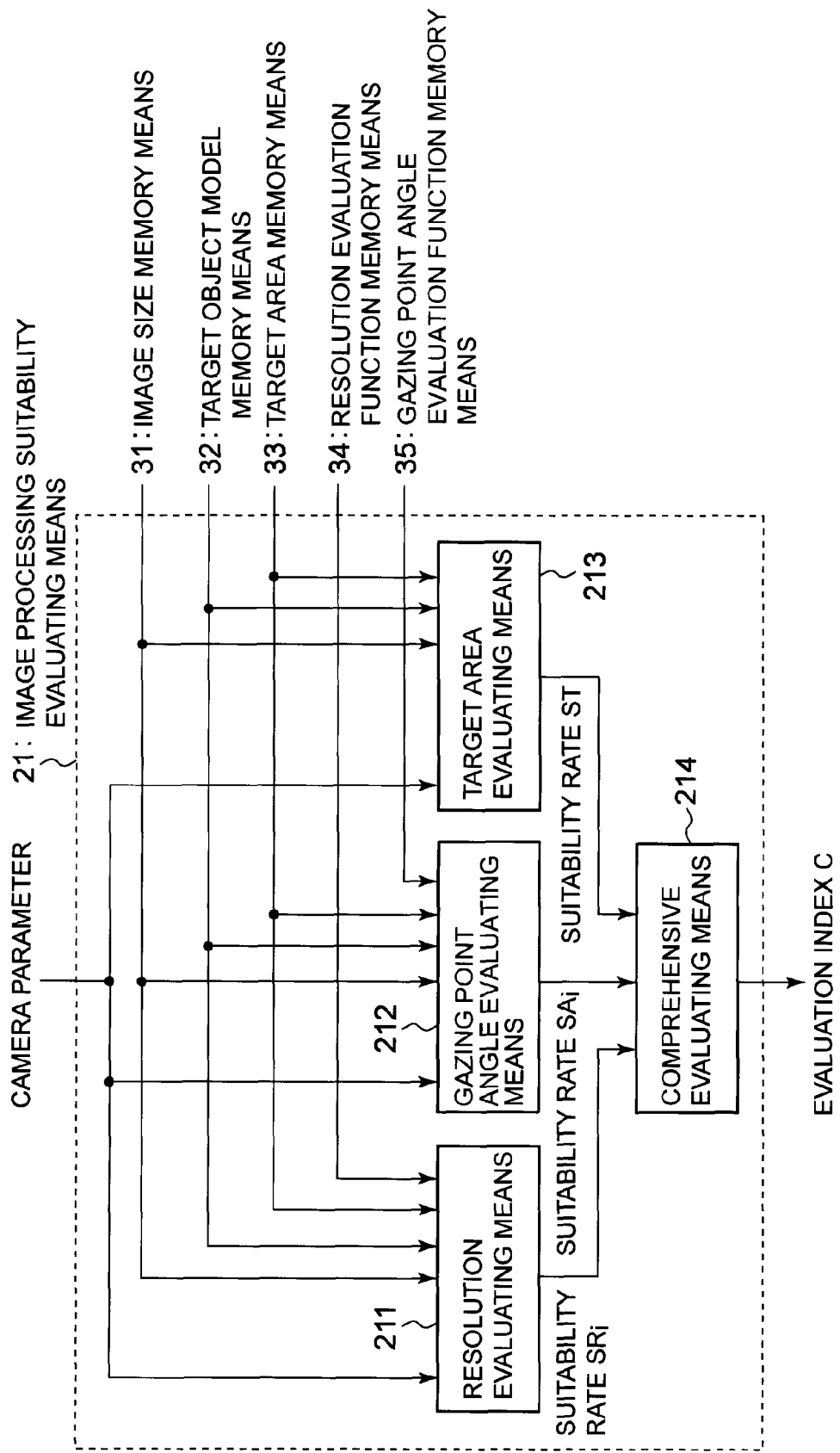
FIG. 6 It depicts a block diagram illustrating an image processing suitability evaluating means 21.

FIG. 6 depicts a block diagram illustrating the image processing suitability evaluating means 21. The image processing suitability evaluating means 21 has a resolution evaluating means 211, a gazing point angle evaluating means 212, a target area evaluating means 213 and a comprehensive evaluating means 214.

The resolution evaluating means 211 virtually arranges a target object at each position in a target area, and generates an image of this state. That is, the resolution evaluating means 211 determines a state in which a target object model is arranged in a target area, and generates an image which represents this state. This image can be an image obtained by simulating an image obtained when the camera captures an image of the target object in real space. The resolution evaluating means 211 acquires resolution from a generated image, and calculates a suitability rate per position in a target area using a resolution evaluation function stored in the resolution evaluation function memory means 34. Resolution obtained from an image generated for a position i in the target area is referred to as "$r_i$". Further, the suitability rate obtained from the resolution $r_i$ is referred to as "$SR_i$".

As described above, calculating the suitability rate $SR_i$ is evaluating clarity of a target object in an image which is important to evaluate suitability of image processing, according to the resolution of the target object. Further, the suitability rate is calculated for each position in the target area means that the resolution evaluating means 211 performs such evaluation on each position in the target area.

Figure 7:
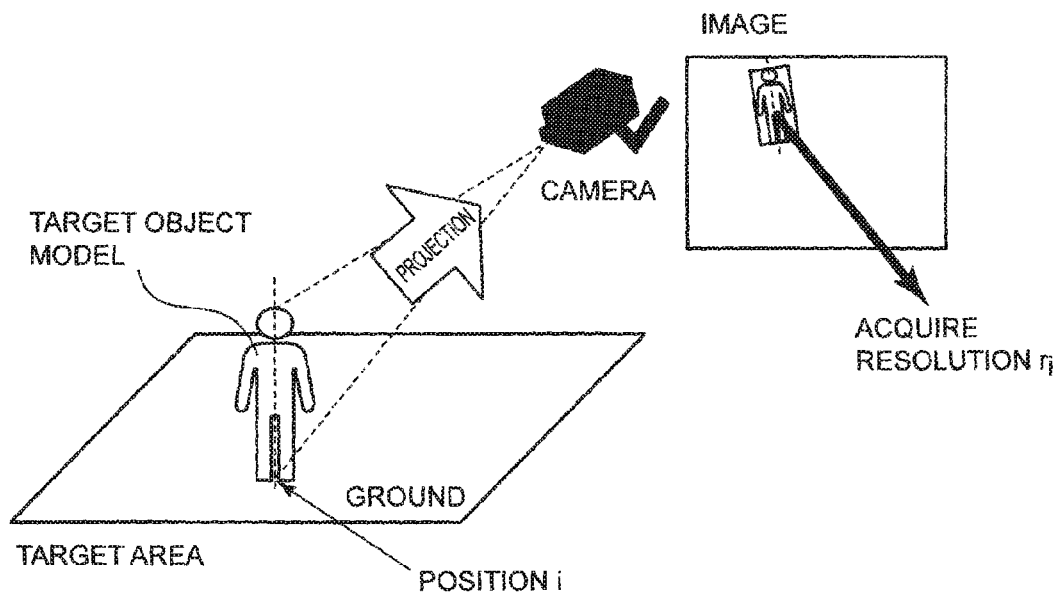
FIG. 7 It depicts a schematic view illustrating an example of acquiring resolution of a target object model.

Processing of the resolution evaluating means 211 will be described in detail. FIG. 7 depicts a schematic view illustrating an example of acquiring resolution of a target object model. The resolution evaluating means 211 virtually arranges a target object at the position i in a target area stored in the target area memory means 33 (in other words, determines a state in which a target object model is arranged at the position i in the target area), and generates an image of this state using camera parameters. That is, the resolution evaluating means 211 generates a simulated image of an image obtained when the camera captures the image of the target object which exists at the position i in the target area. The resolution evaluating means 211 acquires the resolution $r_i$ from the generated image. Further, the resolution evaluating means 211 evaluates this resolution $r_i$ according to a resolution evaluation function FR ($r_i$) stored in the resolution evaluation function memory means 34, and calculates the suitability rate $SR_i$ matching the position i in the target area.

However, when an image in which the target object model is arranged at the position i in the target area is generated, depending on camera parameters, the target object model fits in the image as illustrated in FIG. 8 (a) in some cases or part of the target object model protrudes outside the image as illustrated in FIG. 8 (b) in some cases. When part of the target object model protrudes outside the image, image processing is hardly performed, and therefore the position i from which such an image is generated is not suitable to the image processing. It is also preferably to reflect such a matter in an evaluation according to the resolution evaluation function FR ($r_i$). Hence, the resolution evaluating means 211 preferably calculates the suitability rate $SR_i$ by calculating following equation (1).

$$SR_i = \alpha FR(r_i) \quad \text{Equation (1)}$$

α is a coefficient (referred to as a "penalty coefficient" below) for decreasing a suitability rate when part of a target object protrudes outside a generated image. When part of the target object protrudes outside the image, α needs to be a value less than 1 and, when the target object fits in the image, α=1 needs to be true. When, for example, the target object fits in the image, α=1 may be true and, in other cases, α=0 may be true. Further, for example, a rate of a pixel area of a target object portion which fits in the image with respect to a pixel area of the entire target object may be the penalty coefficient α. The above way to determine a value of α is exemplary, and ways to determine a value of α when a target object does not fit in an image are not limited to the above example.

In addition, the rate of the pixel area of the target object portion which fits in the image with respect to the pixel area of the entire target object is, in other words, a rate of a portion of the target object which fits in the image. Further, there is a correlation that, when the rate of the portion of the target object which fits in the image is higher, the rate of the portion which protrudes outside the image is lower. Hence, the resolution evaluating means 211 can also determine α according to the rate of the portion of the target object which protrudes outside the image.

The resolution evaluating means 211 decides whether or not a target object fits in an image or calculates a rate of a pixel area of a target object portion which fits in the image, using an image size stored in the image size memory means 31.

Further, the position i in the target area from which the resolution evaluating means 211 calculates a suitability rate may be a discretized sample point.

The gazing point angle evaluating means 212 virtually arranges a target object at each position in a target area (in other words, determines a state in which a target object model is arranged in the target area), and calculates a gazing point angle from a straight line which passes on a gazing point of the target object model in this state and a camera position. Further, the gazing point angle evaluating means 212 calculates a suitability rate per position in the target area using the gazing point angle evaluation function stored in the gazing point angle evaluation function memory means 35. The gazing point angle calculated for the position i in the target area is referred to as "$a_i$". Further, the suitability rate obtained from the gazing point angle $a_i$ is referred to as "$SA_i$".

Calculating the suitability rate $SA_i$ as described above is evaluating a difference in appearance of a target object resulting from an image capturing angle of the camera which is important to evaluate suitability of image processing or how target objects overlap, based on a gazing point angle with respect to the target object. Further, the suitability rate is calculated for each position in the target area means that the gazing point angle evaluating means 212 performs such evaluation on each position in the target area.

Figure 9:
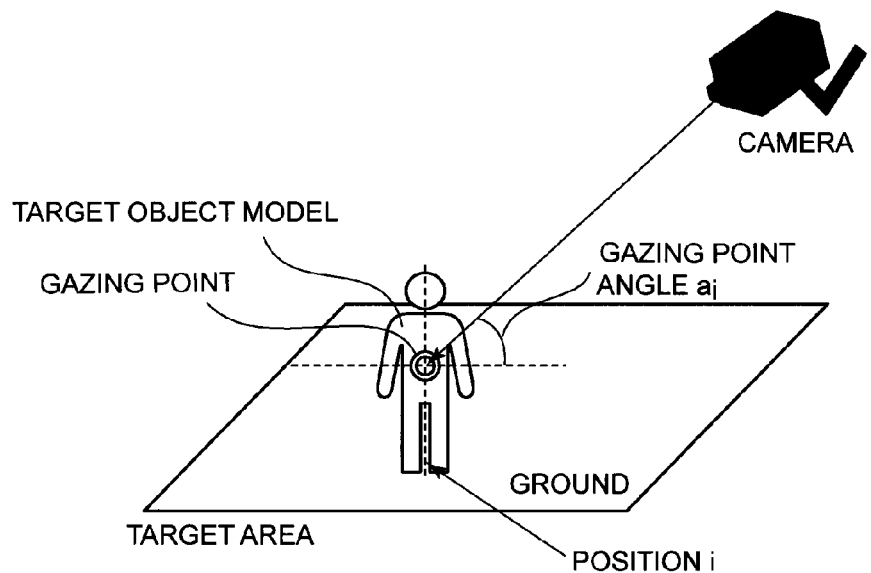
FIG. 9 It depicts a schematic view illustrating an example of acquiring a gazing point angle of the target object model.

Processing of the gazing point angle evaluating means 212 will be described in more detail. FIG. 9 depicts a schematic view illustrating an example of acquiring a gazing point angle of the target object model. The gazing point angle evaluating means 212 virtually arranges a target object at the position i in a target area stored in the target area memory means 33 (in other words, determines a state in which a target object model is arranged at the position i in the target area). Further, the gazing point angle evaluating means 212 calculates a straight line which passes on a camera position and a gazing point such as a gravity point of the target object model at the position i using camera parameters. The gazing point angle evaluating means 212 calculates an angle formed between this straight line and the ground as the gazing point angle $a_i$. Further, the gazing point angle evaluating means 212 evaluates the gazing point angle $a_i$ according to the gazing point angle evaluation function FA ($a_i$) stored in the gazing point angle evaluation function memory means 35, and calculates $SA_i$ matching the position i in the target area.

Figure 8A:
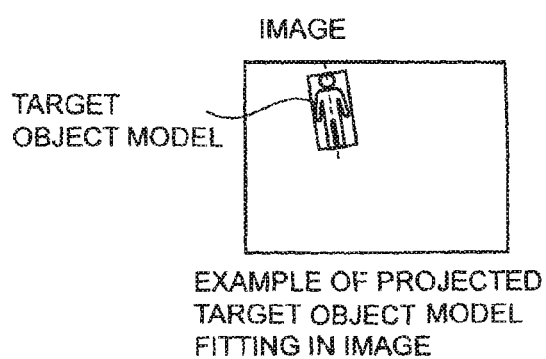
FIG. 8a It depicts an explanatory view illustrating an example where the target object model settles in an image.
Figure 8B:
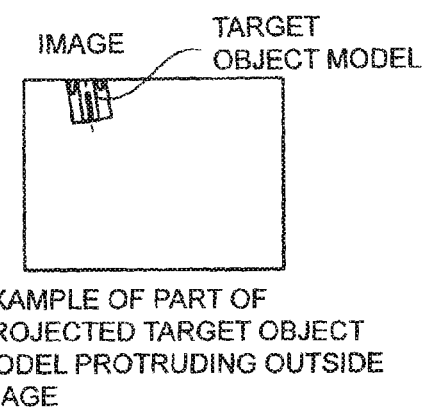
FIG. 8b It depicts an explanatory view illustrating an example where the target object model does not settle in an image.

However, when an image in which the target object model is arranged at the position i in the target area is generated as described above, depending on camera parameters, the target object model fits in the image in some cases (see FIG. 8(a)) or part of the target object model protrudes outside the image in some cases (see FIG. 8(b)). Further, the position i from which such an image from which part of the target object model protrudes is generated is not suitable to the image processing. It is also preferably to reflect such a matter in an evaluation according to the gazing point angle evaluation function FA ($a_i$). Hence, the gazing point angle evaluating means 212 preferably calculates the suitability rate $SA_i$ by calculating following equation (2).

$$SA_i = \alpha FA(a_i) \qquad \text{Equation (2)}$$

α is a penalty coefficient similar to α in equation (1). The way to determine a value of the penalty coefficient α is as already described above, and will not be described.

The gazing point angle evaluating means 212 decides whether or not a target object fits in an image or calculates a rate of a pixel area of a target object portion which fits in the image, using an image size stored in the image size memory means 31.

Further, the position i in the target area from which the gazing point angle evaluating means 212 calculates a suitability rate may be a discretized sample point.

Next, the target area evaluating means 213 calculates a suitability rate by evaluating to what degree a target area and an area (target object field-of-view area) in real space calculated under conditions that a target object is completely shown in an image of a camera accurately overlap. Hereinafter, this suitability rate is referred to as "ST".

An image capturing a small target area in an image or an image capturing a large target area protruding outside the image are not suitable to image processing of accurately capturing the target object in a target area. When, for example, a small target area is captured in an image, the target object is intelligible, and therefore a target object in the image is hardly captured. Further, when a large target area protruding outside an image is captured, there is a blind angle in the target area and, as a result, the target object is hardly captured by image processing. Calculating the above suitability rate ST means evaluating suitability of image processing from a viewpoint that an image capturing a small target area in an image or an image capturing a large target area protruding outside the image are not suitable to image processing of accurately capturing the target object in a target area.

Figure 10:
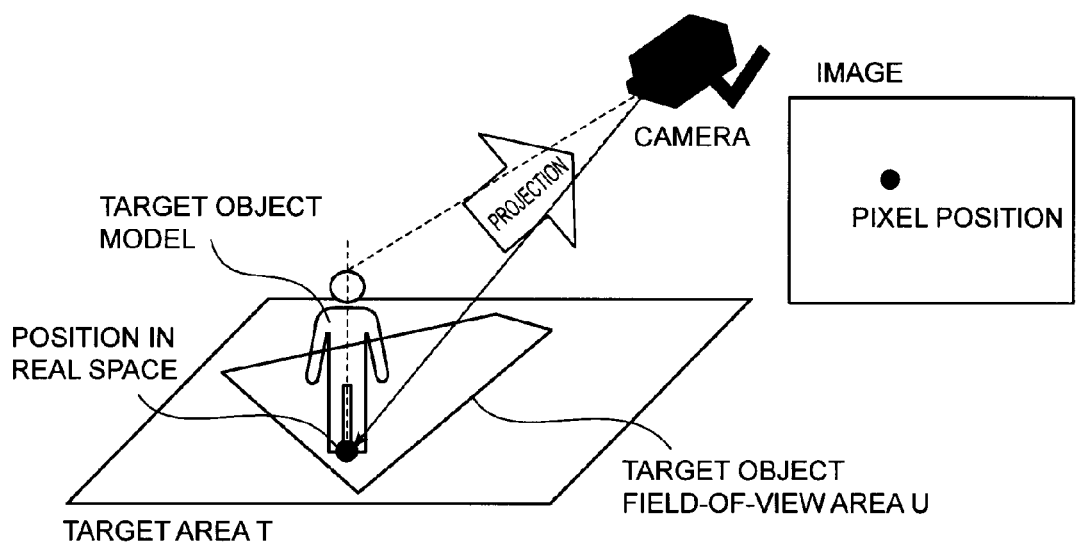
FIG. 10 It depicts a schematic view illustrating an example of determining a target object field-of-view area.

Processing of the target area evaluating means 213 will be described in more detail. FIG. 10 depicts a schematic view illustrating an example of determining a target object field-of-view area. The target area evaluating means 213 determines a position on a ground in real space meeting a pixel position in an image having an image size stored in the image size memory means 31, using camera parameters. When the position on the ground in the real space meeting the pixel position is a point at infinity (or a point corresponding to the point at infinity), the target area evaluating means 213 decides that this position in the real space does not correspond to the target object field-of-view area. When the position in the real space meeting the pixel position is not the point at infinity, the target area evaluating means 213 virtually arranges the target object at this position in the real space (that is, determines a state in which a target object model is arranged at this position), and generates an image of this state. When the target object model fits in this image, the target area evaluating means 213 records this position in the real space as a position corresponding to the target object field-of-view area. When the target object model does not fit in this image, the target area evaluating means 213 decides that this position in the real space does not correspond to the target object field-of-view area. The target area evaluating means 213 performs this processing with respect to, for example, all pixels in an image having an image size. Alternatively, the target area evaluating means 213 may perform the above processing per discrete sample pixel which uniformly and comprehensively covers the entire image.

According to this processing, the target object field-of-view area is determined. Consequently, the target object field-of-view area is a collection of positions which are positions in real space meeting pixel positions in an image, and at which the target object completely fits in the image when the target object is arranged.

Figure 11:
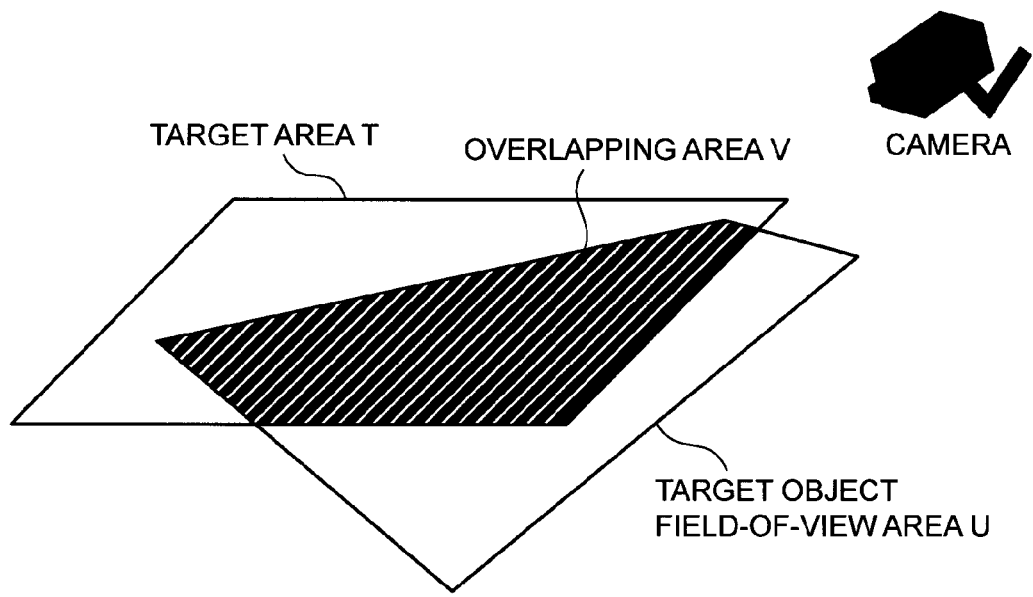
FIG. 11 It depicts a schematic view illustrating an example of how a target area and a target object field-of-view area overlap.

The target area evaluating means 213 obtains a collection of positions in real space recorded as the positions corresponding to the target object field-of-view area, as a target object field-of-view area. Further, the target area evaluating means 213 calculates the suitability rate ST which represents to what degree the target area and the target object field-of-view area accurately overlap by calculating following equation (3). In addition, FIG. 11 depicts an example of how a target area and a target object field-of-view area overlap.

$$ST = \beta(V/T) + (1-\beta)(V/U) \quad \text{Equation (3)}$$

$\beta$ is a weight in equation (3). T is an area of a target area. U is an area of a target object field-of-view area. V is an area of an overlapping area of a target area and a target object field-of-view area. ST is a value of 0 to 1. When the degree that the target area and the target object field-of-view area accurately overlap is higher, the suitability rate ST is closer to 1, and, when the degree that the target area and the target object field-of-view area accurately overlap is lower, the suitability rate ST is closer to 0. When a value of the suitability rate ST is higher, suitability of image processing is also higher.

The comprehensive evaluating means 214 comprehensively evaluates each suitability rate which indicates suitability of image processing from viewpoints of resolution, a gazing point angle and how a target area in an image looks, calculates an evaluation index C which indicates to what degree a camera state (camera parameters) is suitable to image processing, and outputs this evaluation index C.

Processing of the comprehensive evaluating means 214 will be described. The comprehensive evaluating means 214 acquires the suitability rate $SR_i$ at each position i calculated based on the resolution from the resolution evaluating means 211, acquires the suitability rate $SA_i$ at each position i calculated based on the gazing point angle from the gazing point angle evaluating means 212, and acquires the suitability rate ST obtained by evaluating how the target area in the image looks, from the target area evaluating means 213. The comprehensive evaluating means 214 calculates the evaluation index C by calculating following equation (4) using each acquired suitability rate. When the evaluation index C is closer to 0, the camera state (camera parameters) is suitable to image processing.

[Formula 1]

$$C = W_1 \sum_{i=1}^{n} w_i(1-SR_i)^2 + W_2 \sum_{i=1}^{n} w_i(1-SA_i)^2 + W_3(1-ST)^2 \quad \text{Equation (4)}$$

In equation (4), n is the total number of positions when a target area is discretized to a plurality of positions i of the target area. $w_i$ is a weight which indicates importance of the position i in the target area. Further, $W_1$, $W_2$ and $W_3$ are weights which indicate importance of various suitability rates ($SR_i$, $SA_i$, and ST). When $W_1$, $W_2$ and $W_3$ are the same weight, if $W_1$ and $W_2$ are 1, $W_3$ is preferably $nw_i$.

In order to learn that a value of the evaluation index C is close to 0 when the suitability rate $SR_i$ becomes a maximum value "1" and evaluate the importance at the position i in the target area, in a term (the first term) related to the suitability rate $SR_i$ of equation (4), a weighted sum of squares of a difference between 1 and $SR_i$ which takes into account the weight $w_i$ which indicates the importance with respect to the position i is calculated. Similarly, in order to learn that a value of the evaluation index C is close to 0 when the suitability rate $SA_i$ becomes a maximum value "1" and evaluate the importance at the position i in the target area, also in a term (the second term) related to the suitability rate $SA_i$ of equation (4), a weighted sum of squares of a difference between 1 and $SA_i$ which takes into account the weight $w_i$ which indicates the importance with respect to the position i is calculated. Further, from viewpoints that a value of the evaluation index C is close to 0 when the suitability rate ST becomes the maximum value "1" and the same as the first term and the second term is applied to the third term, also in a term (the third term) related to the suitability rate ST of equation (4), a sum of squares of a difference between 1 and ST is calculated.

Calculating equation (4) is calculating a weighted linear sum of a square sum.

The comprehensive evaluating means 214 may output the calculated evaluation index C as is. Alternatively, the comprehensive evaluating means 214 may transform the evaluation index C according to a sigmoid function or a function expressed in equation (5) such that 1 is outputted when suitability of image processing is found and 0 is outputted when no suitability is found, and output a transformed value.

[Formula 2]

$$\frac{1}{\gamma C + 1} \quad \text{Equation (5)}$$

In equation (5), $\gamma$ is an adjustment coefficient, and $\gamma \geq 0$ is true.

Further, the comprehensive evaluating means 214 may output the calculated evaluation index C, and output the suitability rate $SR_i$ at each position i acquired from the resolution evaluating means 211, the suitability rate $SA_i$ at each position i acquired from the gazing point angle evaluating means 212 and the suitability rate ST acquired from the target area evaluating means 213 as is.

Furthermore, the comprehensive evaluating means 214 may display a color matching the suitability rate $SR_i$ of the position i in the target area, at a pixel position in the image meeting the position i or at the very position i in the target area. Similarly, the comprehensive evaluating means 214 may also display a color matching the suitability rate $SA_i$ of the position i in the target area, at a pixel position in the image meeting the position i or at the very position i in the target area. By displaying suitability rates in this way, it is possible to visually represent suitability of image processing and learn a spatial spread of suitabilities. Although a case has been described as an example where suitability rates are displayed by colors, suitability rates may be displayed in modes other than colors.

Next, an operation will be described.

Figure 12:
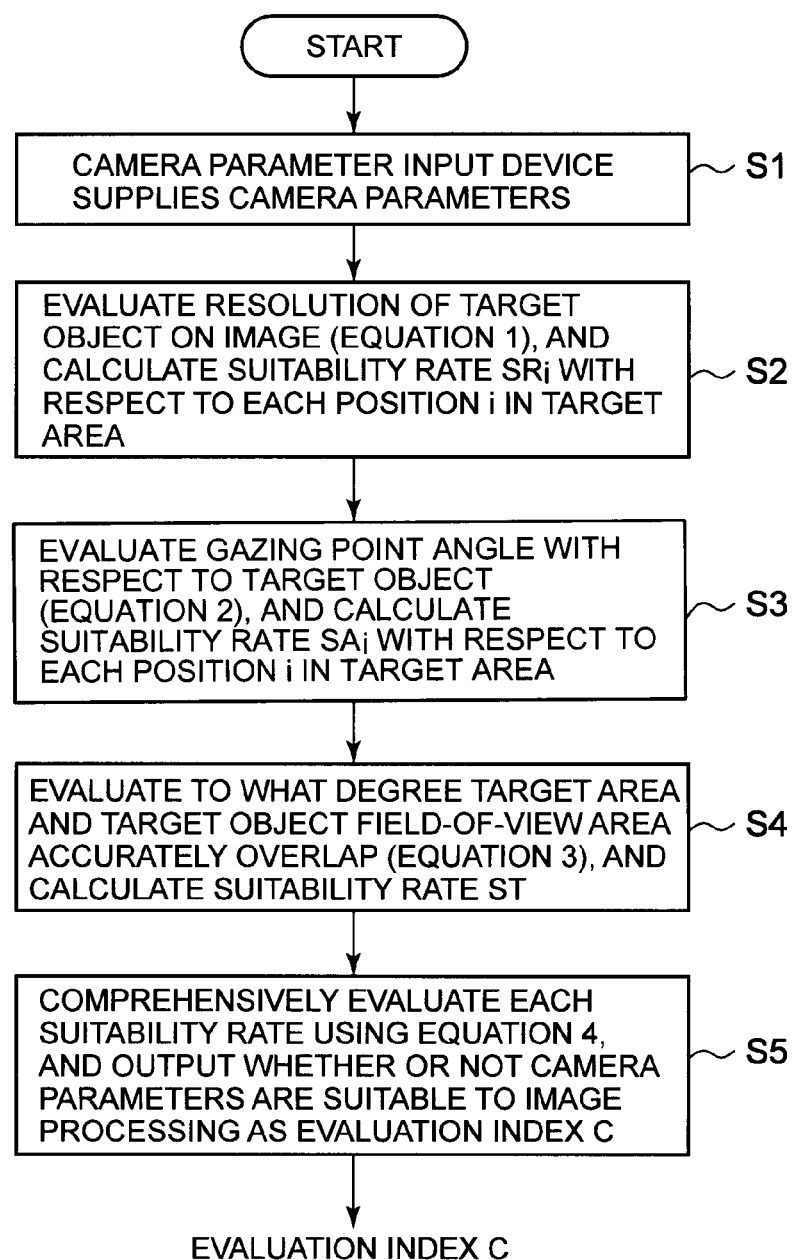
FIG. 12 It depicts a flowchart illustrating an example of processing process according to the first exemplary embodiment.

FIG. 12 depicts a flowchart illustrating an example of processing process according to the first exemplary embodiment. First, the camera parameter input device 1 supplies camera parameters which indicate a camera state to the resolution evaluating means 211, the gazing point angle evaluating means 212 and the target area evaluating means 213 of the image processing suitability evaluating means 21 (step S1).

The resolution evaluating means 211 generates an image of a state in which a target object model is arranged in a target area for each position in a target area. Further, the resolution evaluating means 211 acquires resolution from an image generated per position, and calculates the suitability rate $SR_i$ per position i in the target area using the resolution evaluation function stored in the resolution evaluation function memory means 34 (step S2).

Figure 13:
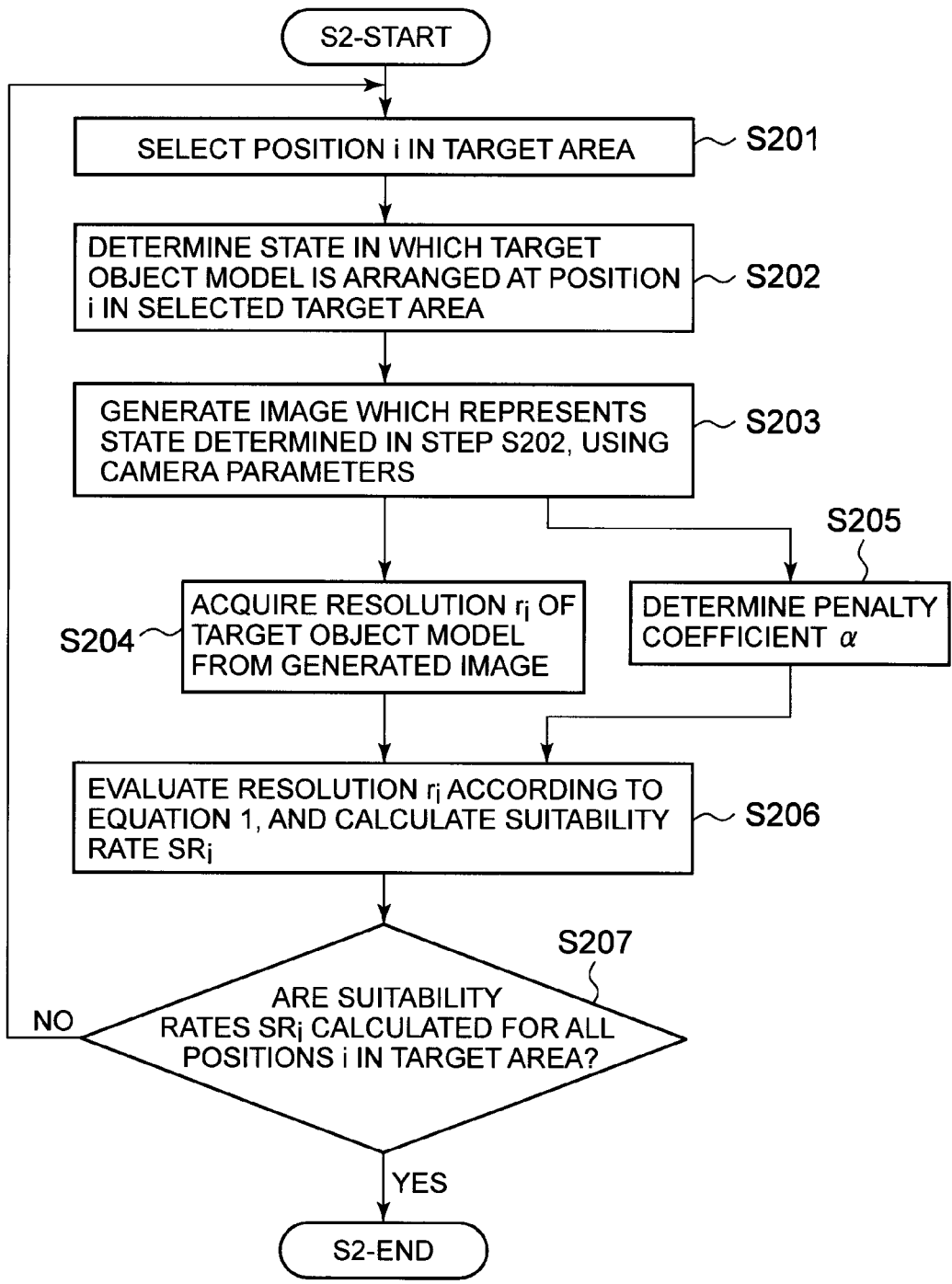
FIG. 13 It depicts a flowchart illustrating an example of processing process in step S2.

Step S2 will be described in more detail. FIG. 13 depicts a flowchart illustrating an example of processing process in step S2. The resolution evaluating means 211 refers to information which indicates a target area stored in the target area memory means 33, and selects an unselected position i from the target area (step S201). Next, the resolution evaluating means 211 determines a state in which a target object model is arranged at the position i in the selected target area (step S202). That is, the resolution evaluating means 211 represents a state in which the target object model is arranged at the position i, using data which represents a position and a size of the target object stored in the target object model memory means 32. Subsequently, the resolution evaluating means 211 generates an image which represents a state determined in step S202, using the camera parameters (step S203).

The resolution evaluating means 211 acquires the resolution $r_i$ of the target object model from the generated image (step S204). Further, simultaneously, the resolution evaluating means 211 refers to an image size stored in the image size memory means 31, decides whether or not the target object model fits in the generated image and, when the target object model fits in the image, determines the penalty coefficient α as 1. Furthermore, when the target object model does not fit in the image, the resolution evaluating means 211 determines α as a value less than 1 (step S205). In this case, for example, a rate of a portion of the target object which fits in the image or a rate of a portion which protrudes from the image may be calculated to determine a value of α based on this rate. As described above, the way to determine α when the target object model does not fit in the image is not limited in particular. Meanwhile, α takes a value in the range of 0 to 1.

After steps S204 and 205, the resolution evaluating means 211 evaluates the resolution $r_i$ by calculating equation (1) using the determined penalty coefficient α and the resolution evaluation function FR ($r_i$), and calculates the suitability rate $SR_i$ matching the selected position i (step S206).

Next, the resolution evaluating means 211 decides whether or not suitability rates $SR_i$ are calculated for all positions i in the target area (step S207). When calculation of the suitability rates $SR_i$ for all positions i in the target area is not completed (No in step S207), the resolution evaluating means 211 repeats processing subsequent to step S201. When calculation of the suitability rates $SR_i$ for all positions i in the target area is completed (Yes in step S207), processing in step S2 is finished.

In addition, suitability rates may be calculated for each position which becomes a discretized sample point in a target area instead of all positions in the target area. The same applies in this regard to step S3 described below.

After step S2, the gazing point angle evaluating means 212 calculates for each position in the target area a gazing point angle when a target object model is arranged in the target area, and calculates the suitability rate $SA_i$ at each position i in the target area using the gazing point angle evaluation function stored in the gazing point angle evaluation function memory means 35 (step S3).

Figure 14:
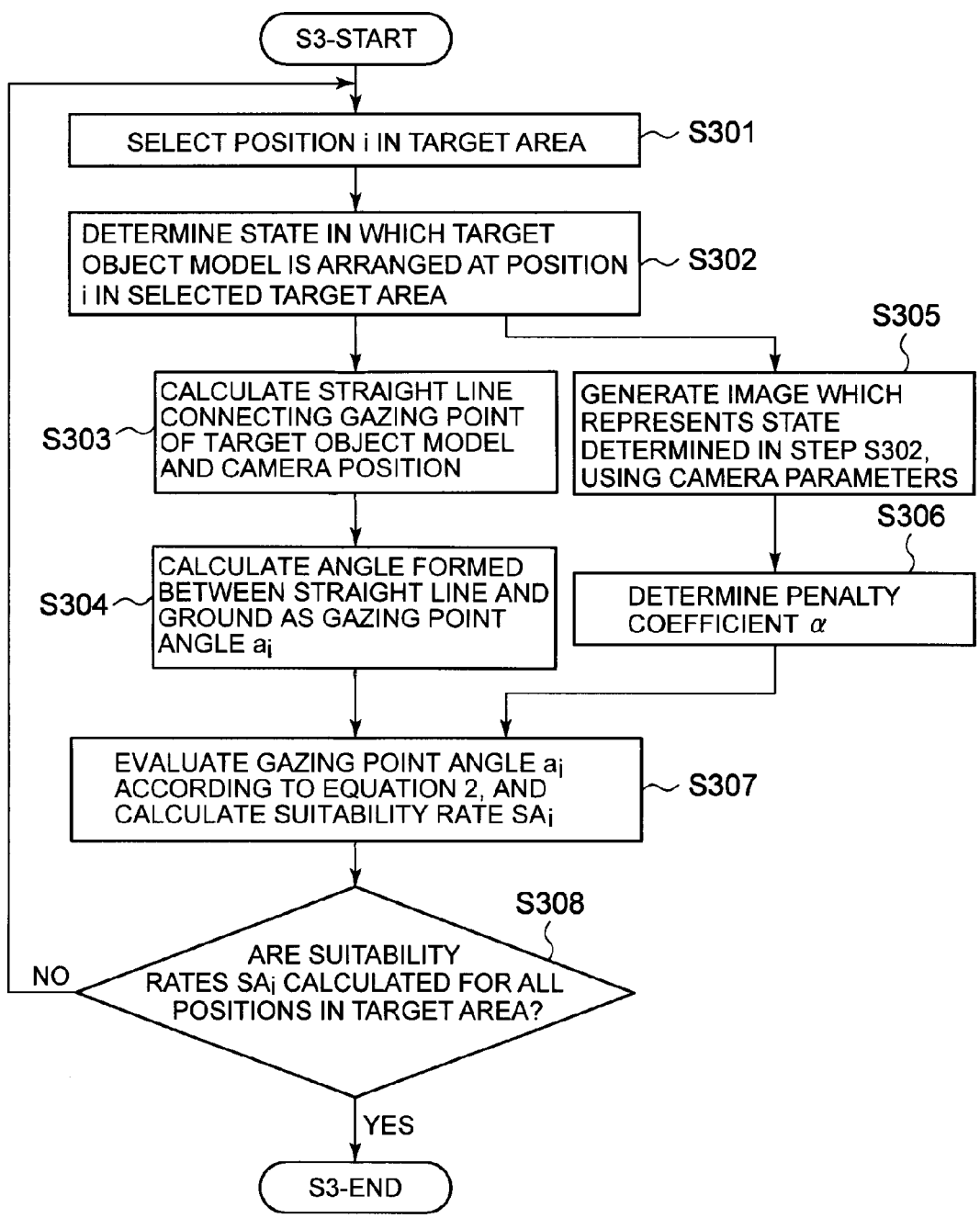
FIG. 14 It depicts a flowchart illustrating an example of processing process in step S3.

Step S3 will be described in more detail. FIG. 14 depicts a flowchart illustrating an example of processing process in step S3. The gazing point angle evaluating means 212 refers to information which indicates a target area stored in the target area memory means 33, and selects an unselected position i from the target area (step S301). Next, the gazing point angle evaluating means 212 determines a state in which a target object model is arranged at the position i in the selected target area (step S302). That is, the gazing point angle evaluating means 212 represents a state in which the target object model is arranged at the position i, using data which represents a position and a size of the target object stored in the target object model memory means 32.

Further, the gazing point angle evaluating means 212 calculates a straight line which passes on a camera position which is defined by camera parameters and a gazing point of the camera such as a gravity point of the target object model in the state determined in step S302 (step S303). Furthermore, the gazing point angle evaluating means 212 calculates an angle formed between this straight line and the ground as the gazing point angle $a_i$ (step S304).

Still further, in parallel to steps S302 and S303, the gazing point angle evaluating means 212 generates the image which represents the state determined in step S302, using the camera parameters (step S305). Moreover, the gazing point angle evaluating means 212 refers to the image size stored in the image size memory means 31, decides whether or not the target object model fits in the generated image and, when the target object model fits in the image, determines the penalty coefficient α as 1. Further, when the target object model does not fit in the image, the gazing point angle evaluating means 212 determines α as a value less than 1 (step S306). Step S306 is the same as processing in step S205 performed by the resolution evaluating means 211. As described above, a is a value in the range of 0 to 1.

After steps S304 and S306, the gazing point angle evaluating means 212 evaluates the gazing point angle $a_i$ by calculating equation (2) using the determined penalty coefficient α and the gazing point angle evaluation function FA ($a_i$), and calculates the suitability rate $SA_i$ matching the selected position i (step S307).

Next, the gazing point angle evaluating means 212 decides whether or not suitability rates $SA_i$ are calculated for all positions i in the target area (step S308). When calculation of the suitability rates $SA_i$ for all positions i in the target area is not completed (No in step S308), the gazing point angle evaluating means 212 repeats processing subsequent to step S301. When calculation of the suitability rates $SA_i$ for all positions i in the target area is completed (Yes in step S308), processing in step S3 is finished.

After step S3, the target area evaluating means 213 calculates the suitability rate ST which indicates to what degree the target area and the target object field-of-view area accurately overlap (step S4).

Figure 15:
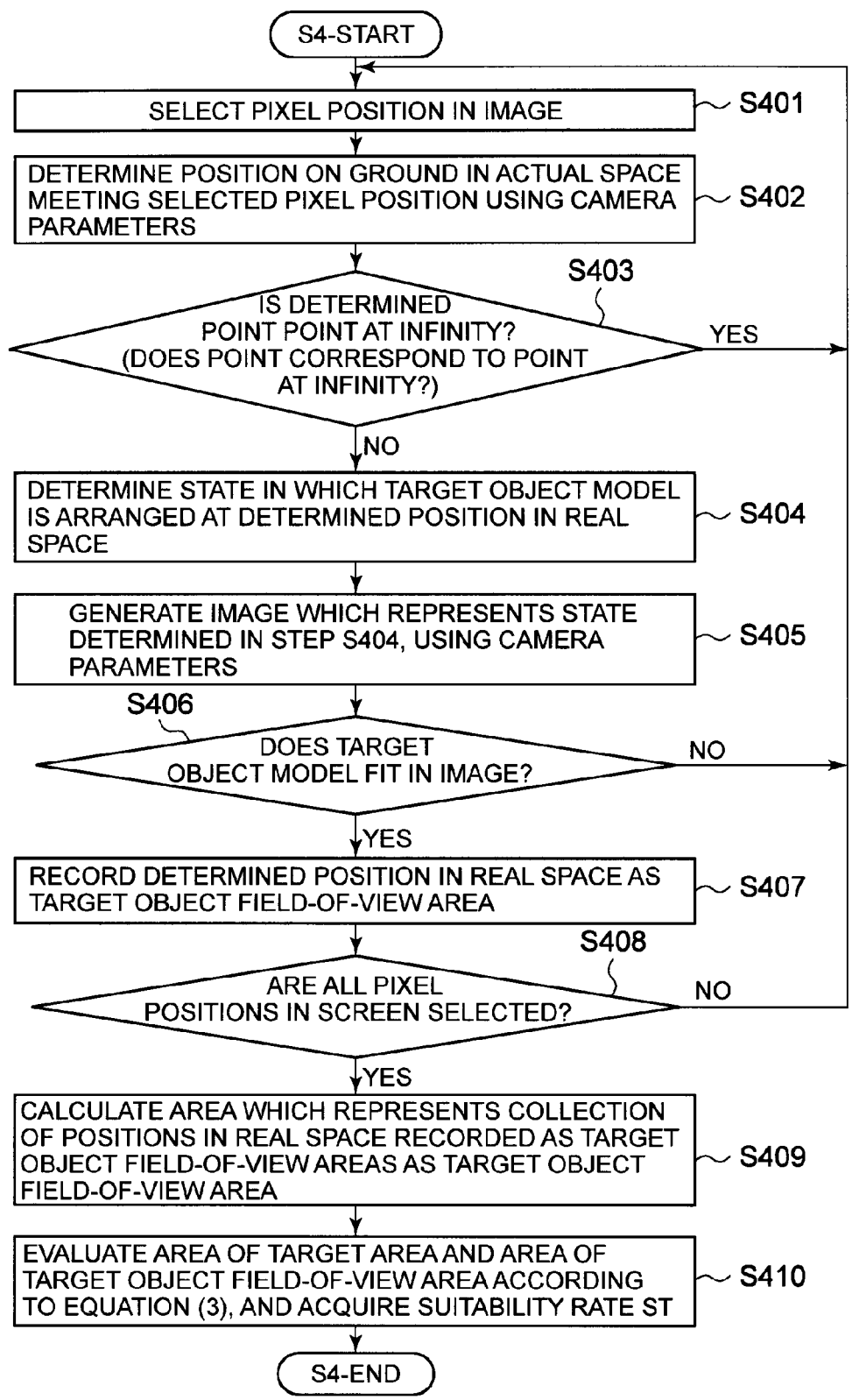
FIG. 15 It depicts a flowchart illustrating an example of processing process in step S4.

Step S4 will be described in more detail. FIG. 15 depicts a flowchart illustrating an example of processing process in step S4. The target area evaluating means 213 selects an unselected pixel position from pixel positions of images having sizes defined by image sizes stored in the image size memory means 31 (step S401). Further, the target area evaluating means 213 determines a position on the ground in real space meeting the selected pixel position, using the camera parameters (step S402). The target area evaluating means 213 decides whether or not the position in the real space determined in step S402 is a point at infinity (or a point corresponding to the point at infinity) (step S403). When the position in the real space determined in step S402 is the point at infinity (or the point corresponding to the point at infinity) (Yes in step S403), processing subsequent to step S401 is repeated.

When the position in the real space determined in step S402 is not the point at infinity (or the point corresponding to the point at infinity) (No in step S403), the target area evaluating means 213 determines a state in which the target object model is arranged at this position in the real space (step S404). That is, the target area evaluating means 213 represents a state in which the target object model is arranged at this position, using data which represents a position and a size of the target object stored in the target object model memory means 32. Subsequently, the target area evaluating means 213 generates an image which represents the state determined in step S404, using the camera parameters (step S405).

Further, the target area evaluating means 213 refers to the image size stored in the image size memory means 31, and decides whether or not the target object model fits in the generated image (step S406). When the target object model does not fit in the image (No in step S406), the processing subsequent to step S401 is repeated.

When the processing subsequent to step S401 is repeated as a result of decision in steps S403 and S406 (Yes in step S403 or No in step S406), it is decided that the position in the real space determined in immediate step S402 does not correspond to a target object field-of-view area.

When the target object model fits in the image in step S406 (Yes in step S406), the target area evaluating means 213 records the position in the real space determined in immediate step S402 as the target object field-of-view area (step S407).

Next, the target area evaluating means 213 decides whether or not all pixel positions in the image are selected (step S408). When there are unselected pixel positions left in the image (No in step S408), the target area evaluating means 213 repeats the processing subsequent to step S401.

When all pixel positions in the image are selected (Yes in step S408), the target area evaluating means 213 finds an area which represents a collection of positions in the real space recorded as the target object field-of-view areas, as a target object field-of-view area (step S409).

Next, the target area evaluating means 213 refers to the target area stored in the target area memory means 33, and calculates an area V of an overlapping area of the target area and the target object field-of-view area. Further, the target area evaluating means 213 calculates the suitability rate ST by calculating equation (3) using the area T of the target area, the area U of the target object field-of-view area and the area V of the overlapping area stored in the target area memory means 33 (step S410), and finishes the processing in step S4.

After step S4, the comprehensive evaluating means 214 acquires the suitability rate $SR_i$ at each position i calculated based on the resolution from the resolution evaluating means 211, acquires the suitability rate $SA_i$ at each position i calculated based on the gazing point angle from the gazing point angle evaluating means 212, and acquires the suitability rate ST obtained by evaluating how the target area in the image looks, from the target area evaluating means 213. Further, the comprehensive evaluating means 214 calculates and outputs the evaluation index C which represents to what degree the camera parameters are suitable to image processing, using these suitability rates (step S5). More specifically, the comprehensive evaluating means 214 calculates the evaluation index C by calculating equation (4) using the suitability rates $SR_i$ and $SA_i$ and the suitability rate ST calculated for each position in the target area.

In addition, the order to execute steps S2, S3 and S4 in the flowchart illustrated in FIG. 12 may be arbitrary.

Using resolution which indicates clarity of a target object in an image in which a target object is arranged at each position in a target area, a gazing point angle which indicates a difference in appearance of the target object depending on an image capturing angle of a camera or how target objects overlap at each position in the target area, and the degree that the target area and the target object field-of-view area overlap which indicates a difference in how the target area looks in the image, the camera position posture evaluating device according to the first exemplary embodiment comprehensively evaluates suitability of image processing on the camera parameters and outputs the result as the evaluation index C. Consequently, when image processing is performed for an assumed target area and a target object, it is possible to provide to what degree camera parameters to be evaluated are suitable, as an evaluation index.

Further, as described above, the comprehensive evaluating means 214 may display, for example, a color matching the suitability rate $SR_i$ of the position i in the target area, at a pixel position in the image meeting the position i or at the very position i in the target area. Similarly, the comprehensive evaluating means 214 may also display a color matching the suitability rate $SA_1$ of the position i in the target area, at a pixel position in the image meeting the position i or at the very position i in the target area. By outputting such display, it is possible to visually represent suitability of image processing.

Further, the image processing suitability evaluating means 21 may employ a configuration including only one of the resolution evaluating means 211 and the gazing point angle evaluating means 212 and not including the other one. For example, when the image processing suitability evaluating means 21 does not have the resolution evaluating means 211, step S2 may not be executed. Further, the comprehensive evaluating means 214 only needs to calculate the evaluation index C as a sum of the second term and the third term of equation (4). Furthermore, when, for example, the image processing suitability evaluating means 21 does not have the gazing point angle evaluating means 212, step S3 may not be executed. Still further, the comprehensive evaluating means 214 only needs to calculate the evaluation index C as a sum of the first term and the third term of equation (4). Even in this case, it is possible to evaluate to what degree camera parameters are suitable to image processing.

Second Exemplary Embodiment

Figure 16:
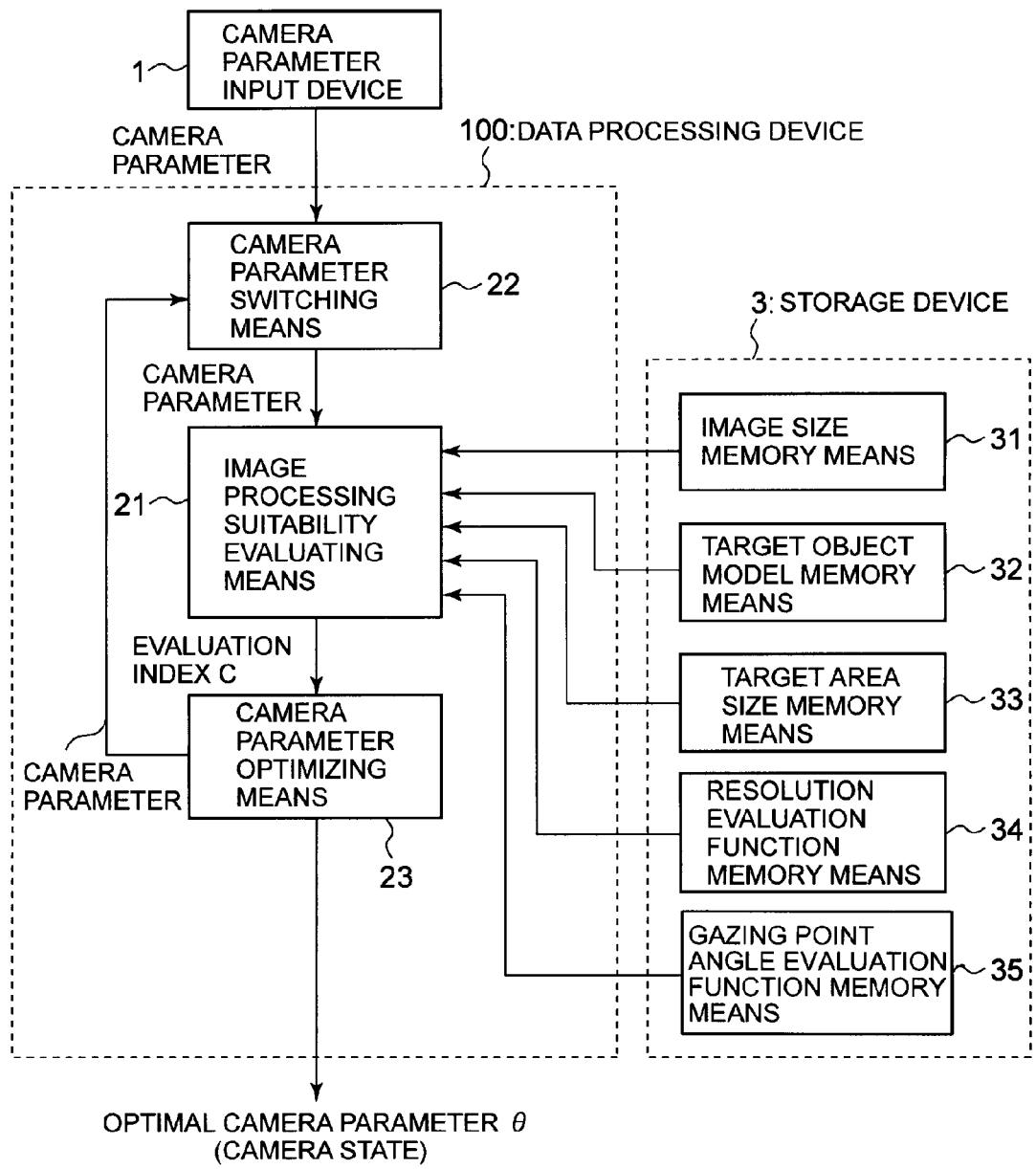
FIG. 16 It depicts a block diagram illustrating a configuration example of a camera position posture evaluating device according to a second exemplary embodiment of the present invention.

FIG. 16 depicts a block diagram illustrating a configuration example of a camera position posture evaluating device according to a second exemplary embodiment of the present invention. The same components as those in the first exemplary embodiment will be as signed the same reference numerals as those in FIG. 1, and will not be described in detail. In the second exemplary embodiment, a data processing device 100 has a camera parameter switching means 22 and a camera parameter optimizing means 23 in addition to an image processing suitability evaluating means 21.

The camera parameter switching means 22 supplies camera parameters supplied from the camera parameter input device 1 or the camera parameter optimizing means 23, to the image processing suitability evaluating means 21. More specifically, the camera parameter switching means 22 supplies as default the camera parameters supplied from the camera parameter input device 1, to the image processing suitability evaluating means 21. Further, the camera parameter switching means 22 then supplies the camera parameters supplied from the camera parameter optimizing means 23 to the image processing suitability evaluating means 21. That is, after supplying as default the camera parameters, the camera parameter switching means 22 switches a supply source of the camera parameters from the camera parameter input device 1 to the camera parameter optimizing means 23.

The camera parameter optimizing means 23 updates the camera parameters such that an evaluation index is small (that is, a state becomes more suitable to image processing) using an evaluation index C outputted from the image processing suitability evaluating means 21. Further, the camera parameter optimizing means 23 supplies the updated camera parameters to the camera parameter switching means 22. The camera parameter optimizing means 23 optimizes the camera parameters by updating the camera parameters every time the evaluation index C is calculated.

The camera parameter optimizing means 23 only needs to calculate the updated camera parameters by, for example, calculating following equation (6). For an optimizing method, a known method such as a steepest descent method may be used.

[Formula 3]

$$\hat{\theta} = \underset{\theta}{\operatorname{argmin}} \left( W_1 \sum_{i=1}^{n} w_i (1 - SR_i(\theta))^2 + W_2 \sum_{i=1}^{n} w_i (1 - SA_i(\theta))^2 + W_3 (1 - ST(\theta))^2 \right) \quad \text{Equation (6)}$$

The same as equation (4) applies to n, wi, W1, W2 and W3. θ indicates a camera parameter. θ indicated together with a hat sign on a left side of equation (6) is an updated camera parameter. Further, suitability rates $SR_i$, $SA_i$ and ST are values which change following a change of the camera parameter θ, and therefore these suitability rates are functions of θ in equation (6).

In addition, to optimize camera parameters, limitations to, for example, fix part of camera parameters values or limit a range of values taken by the camera parameters may be provided. When, for example, a position to install a camera is determined, upon an update of camera parameters, the camera parameter optimizing means 23 may fix a translation matrix T which is an external parameter which indicates a camera position, and fluctuates a rotation matrix R which is an external parameter which indicates a camera direction and an internal parameter which indicates camera characteristics.

Figure 17:
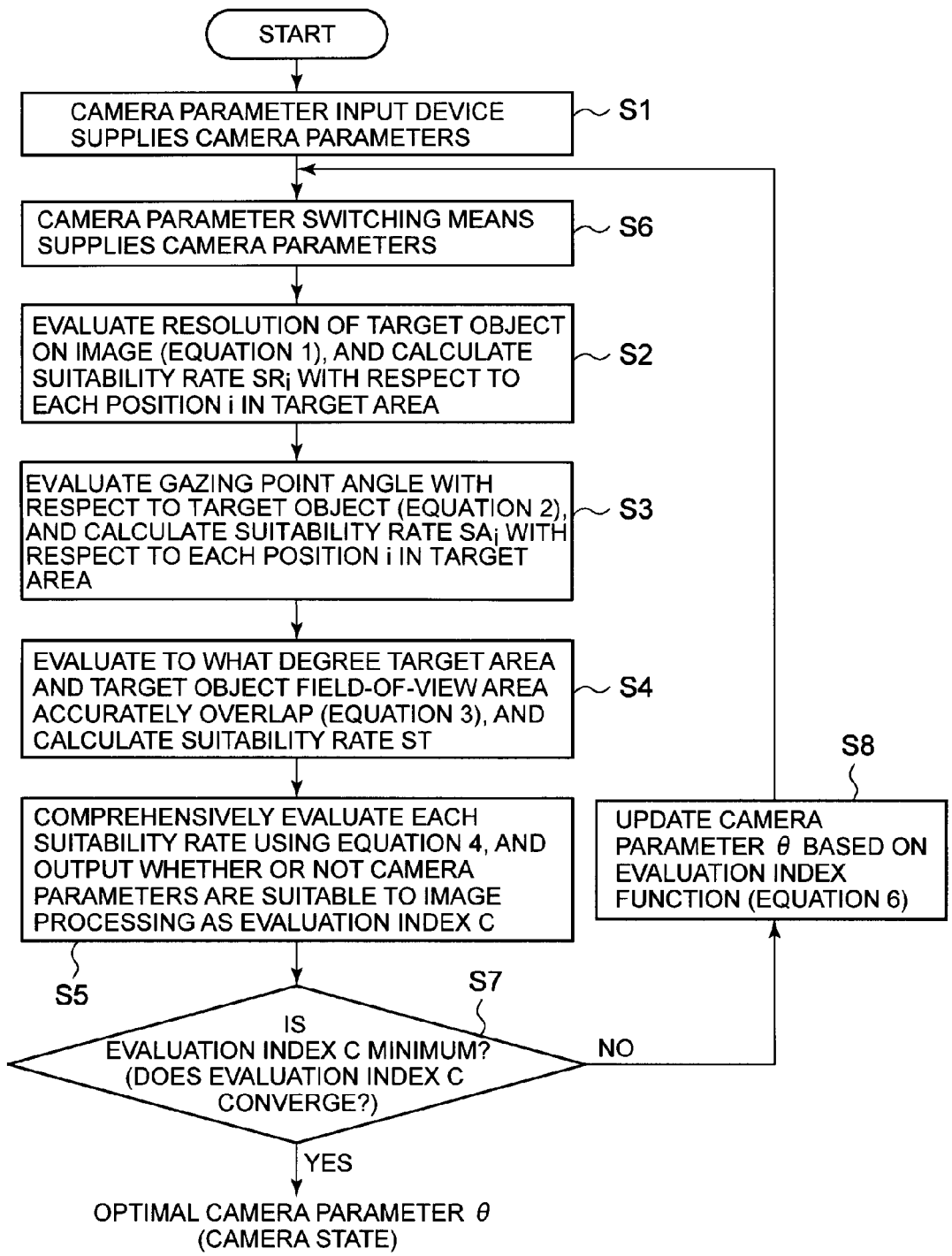
FIG. 17 It depicts a flowchart illustrating an example of processing process according to the second exemplary embodiment.

FIG. 17 depicts a flowchart illustrating an example of processing process according to the second exemplary embodiment. First, the camera parameter input device 1 supplies camera parameters to the camera parameter switching means 22 (step S1).

Further, the camera parameter switching means 22 supplies the camera parameters supplied from the camera parameter input device 1 or the camera parameter optimizing means 23, to the image processing suitability evaluating means 21 (more specifically, a resolution evaluating means 211, a gazing point angle evaluating means 212 and a target area evaluating means 213) (step S6).

Meanwhile, in first step S6 after step S1, the camera parameter switching means 22 supplies the camera parameters supplied from the camera parameter input device 1, to the image processing suitability evaluating means 21.

Further, when second or subsequent step S6 is executed (in other words, when step S6 is executed after step S8 described below), the camera parameter switching means 22 supplies the camera parameters supplied from the camera parameter optimizing means 23 in step S8, to the image processing suitability evaluating means 21.

After step S6, the image processing suitability evaluating means 21 executes processing insteps S2 to S5. The processing in steps S2 to S5 is the same as processing in step S2 to S5 in the first exemplary embodiment (see FIG. 12), and will not be described.

After step S5, the camera parameter optimizing means 23 decides whether or not the evaluation index C outputted from the comprehensive evaluating means 214 (see FIG. 6) in step S5 becomes a minimum value (step S7). When the evaluation index C is not a minimum value (No in step S7), processing transitions to step S8. Further, when the evaluation index C is the minimum value (Yes in step S7), the camera parameter optimizing means 23 outputs a camera parameter θ updated in immediate step S8 as a camera parameter which is optimal for image processing.

Furthermore, the camera parameter optimizing means 23 may decide in step S7 whether or not the evaluation index C converges. In this case, when the evaluation index C does not converge (No in step S7), processing transitions to step S8. When the evaluation index C converges (Yes in step S7), the camera parameter optimizing means 23 outputs the camera parameter θ updated in immediate step S8 as a camera parameter which is optimal for image processing.

A deciding method in step S7 is not limited in particular. When, for example, whether or not the evaluation index C converges is decided, if a difference between values of the evaluation index C and a previous evaluation index C is a predetermined threshold or less, it is possible to decide that the evaluation index C converges and, if the difference exceeds the threshold, it is also possible to decide that the evaluation index C does not converge.

In step S8, the camera parameter optimizing means 23 calculates the updated camera parameter by calculating equation (6) (step S8). More specifically, the camera parameter optimizing means 23 only needs to calculate the updated parameter by calculating equation (6) by substituting the suitability rate $SR_i$ per position obtained in step S2, the suitability rate $SA_i$ per position obtained in step S3 and the suitability rate ST obtained in step S4 in $SR_i(\theta)$, $SA_i(\theta)$ and $ST(\theta)$ in equation (6). The camera parameter optimizing means 23 supplies the updated camera parameter to the camera parameter switching means 22.

Subsequently, the data processing device 100 repeats the processing subsequent to step S6. Upon execution of second or subsequent step S6, the camera parameter switching means 22 supplies the camera parameter updated by the camera parameter optimizing means 23 in immediate step S8 to the image processing characteristics evaluating means 21.

Thus, the camera parameters outputted from the camera parameter optimizing means 23 when processing in steps S6, S2, S3, S4, S5, S7 and S8 is repeated and it is decided in step S7 that the evaluation index C becomes a minimum value (alternatively, the evaluation index C converges) are camera parameters which are optimal for image processing.

Also in the second exemplary embodiment, suitability of image processing is comprehensively evaluated, and the evaluation index C is calculated similar to the first exemplary embodiment. Further, the camera parameter optimizing means 23 repeats processing of updating the camera parameter such that an evaluation index becomes small and calculating the evaluation index C. Consequently, according to the present exemplary embodiment, it is possible to calculate for an assumed target area and target object the camera parameters (camera state) which are optimal for image processing. Further, the data processing device 100 can perform processing of automatically calculating the camera parameters which are optimal for image processing, so that users do not need to adjust a position and a posture of the camera by trial and error.

Third Exemplary Embodiment

Figure 18:
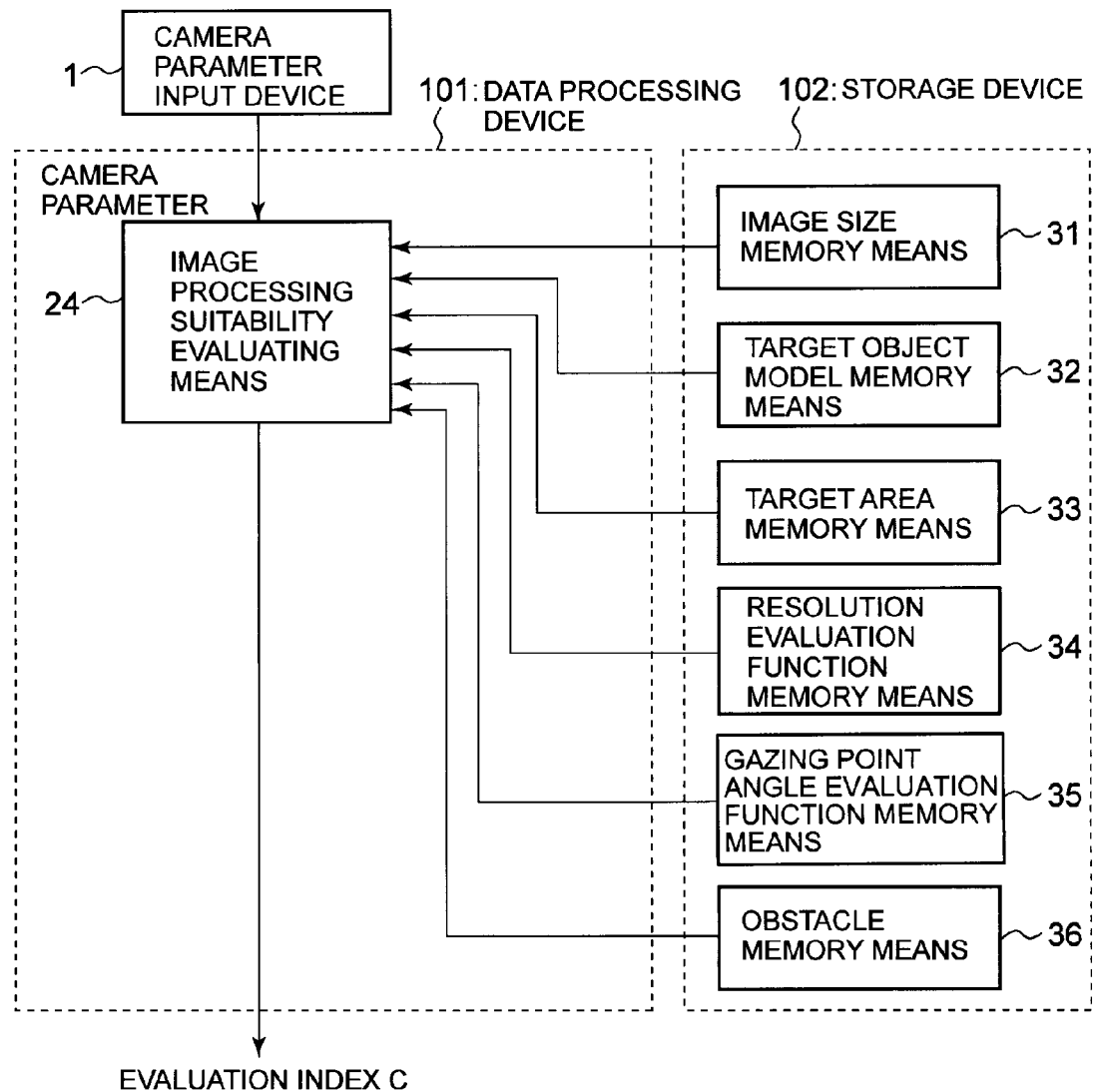
FIG. 18 It depicts a block diagram illustrating a configuration example of a camera position posture evaluating device according to a third exemplary embodiment of the present invention.

FIG. 18 depicts a block diagram illustrating a configuration example of a camera position posture evaluating device according to a third exemplary embodiment of the present invention. The same components as those in the first exemplary embodiment and the second exemplary embodiment will be assigned the same reference numerals as in FIGS. 1 and 16, and will not be described in detail.

A storage device 102 according to the third exemplary embodiment has an image size memory means 31, a target object model memory means 32, a target area memory means 33, a resolution evaluation function memory means 34, a gazing point angle evaluation function memory means 35 and an obstacle memory means 36.

The obstacle memory means 36 stores a position, a shape and a size of the obstacle which exists in the target area.

Figure 19:
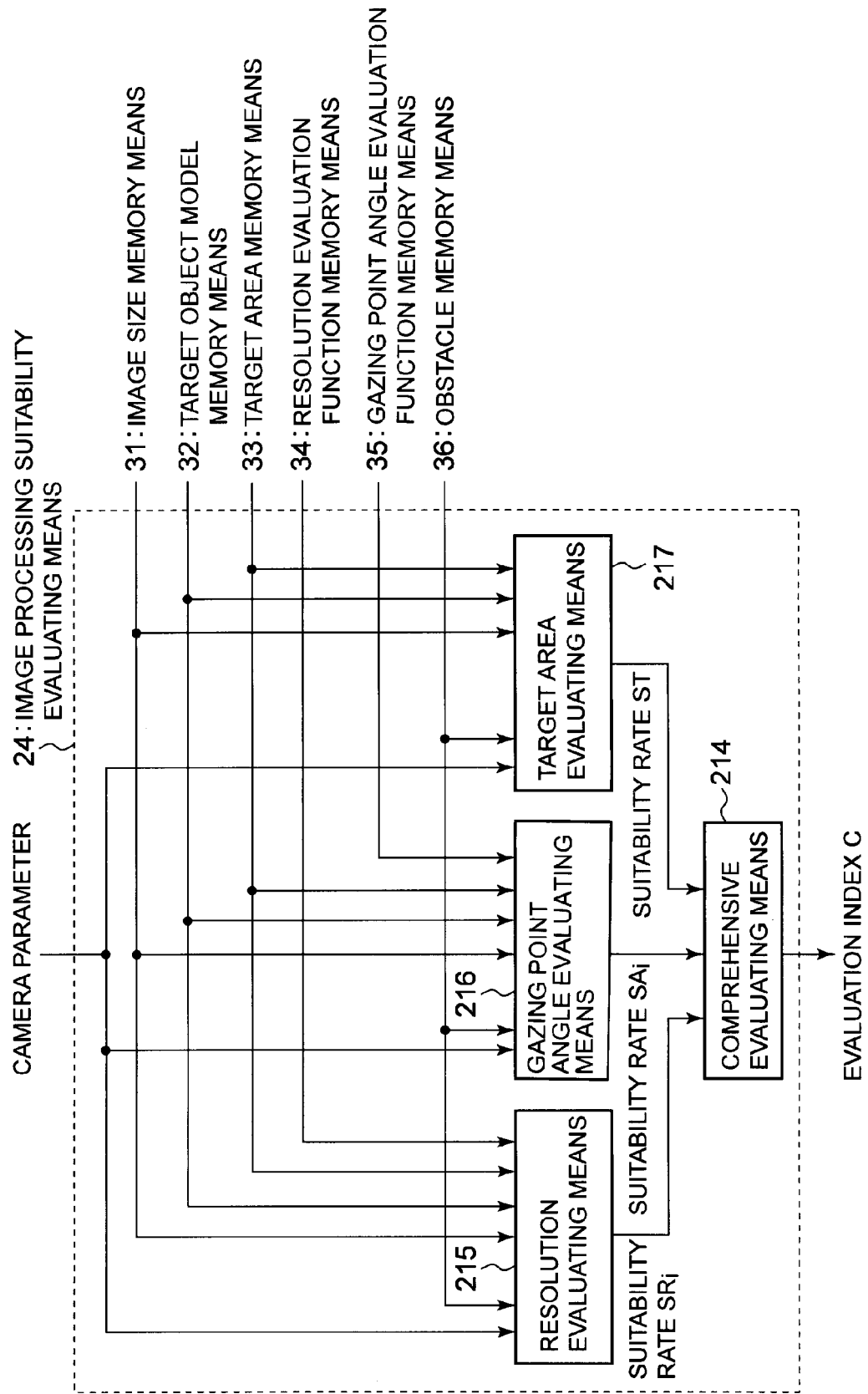
FIG. 19 It depicts a block diagram illustrating an image processing characteristics evaluating means 24.

Further, the data processing device 101 according to the third exemplary embodiment has an image processing characteristics evaluating means 24. FIG. 19 depicts a block diagram illustrating the image processing characteristics evaluating means 24. The image processing characteristics evaluating means 24 has a resolution evaluating means 215, a gazing point angle evaluating means 216, a target area evaluating means 217 and a comprehensive evaluating means 214. The comprehensive evaluating means 214 is the same as a comprehensive evaluating means 214 in the first exemplary embodiment.

The resolution evaluating means 215 differs from a resolution evaluating means 211 (see FIG. 6) according to the first exemplary embodiment in a method of determining a penalty coefficient. The resolution evaluating means 215 also refers to information stored in the obstacle memory means 36 upon creation of an image of a state in which a target object model is arranged in a target area, and generates an image of a state in which the target object model is arranged at a position i in the target area and an obstacle having a shape and a size stored in the obstacle memory means 36 is arranged at a position stored in the obstacle memory means 36. Further, the resolution evaluating means 215 provides a value less than 1 for α when part of the target object model protrudes outside the image or when the target object model hides behind the obstacle in the image. Furthermore, the resolution evaluating means 215 provides α=1 when the target object model fits in the image and the target object model does not hide behind an obstacle in the image. Whether or not a target object model hides behind an obstacle or to what degree the target object model hides behind the obstacle in the image are decided based on camera parameters and information of positions, shapes and sizes of obstacles stored in the obstacle memory means 36.

An example of determining a penalty coefficient α will be described. For example, the resolution evaluating means 215 may provide α=1 when a target object model fits in an image and the target object model does not hide behind an obstacle in the image, and provide α=0 in other cases. Further, for example, the resolution evaluating means 215 calculates a pixel area (P) of a target object model portion which does not protrude outside the image and which does not hide behind an object, and determine α rate of the pixel area P with respect to a pixel area of the entire target object as the penalty coefficient α. This rate is a rate of a portion of a target object which fits in an image and which does not hide behind an obstacle. The above way to determine α value of α is exemplary, and ways to determine α value of α are not limited to the above example when a target object does not fit in an image or when a target object does not hide behind an obstacle.

The other processing of the resolution evaluating means 215 is the same as processing of the resolution evaluating means 211 according to the first exemplary embodiment.

The gazing point angle evaluating means 216 differs from a resolution evaluating means 212 (see FIG. 6) according to the first exemplary embodiment in a method of determining a penalty coefficient. The gazing point angle evaluating means 216 also refers to information stored in the obstacle memory means 36 upon creation of an image of a state in which a target object model is arranged in a target area, and generates an image of a state in which the target object model is arranged at a position i in the target area and an obstacle having a shape and a size stored in the obstacle memory means 36 is arranged at a position stored in the obstacle memory means 36. Further, the gazing point angle evaluating means 216 determines a penalty coefficient similar to the resolution evaluating means 215 according to the present exemplary embodiment.

The other processing of the gazing point angle evaluating means 216 is the same as processing of a gazing point angle evaluating means 212 according to the first exemplary embodiment.

The target area evaluating means 217 determines a position on a ground in real space meeting a pixel position in an image similar to a target area evaluating means 213 according to the first exemplary embodiment. Further, the target area evaluating means 217 also refers to information stored in the obstacle memory means 36 upon creation of an image of a state in which a target object model is arranged at the position, and generates an image of a state in which the target object model is arranged at the position and an obstacle having a shape and a size stored in the obstacle memory means 36 is arranged at a position stored in the obstacle memory means 36. Furthermore, when the target object model fits in this image and does not hide behind the obstacle, the target area evaluating means 217 records this position in the real space as a position corresponding to the target object field-of-view area. When this is not a case, the target area evaluating means 217 decides that this position in the real space does not correspond to a target object field-of-view area.

The other processing of the target area evaluating means 217 is the same as processing of the target area evaluating means 213 according to the first exemplary embodiment.

Figure 20:
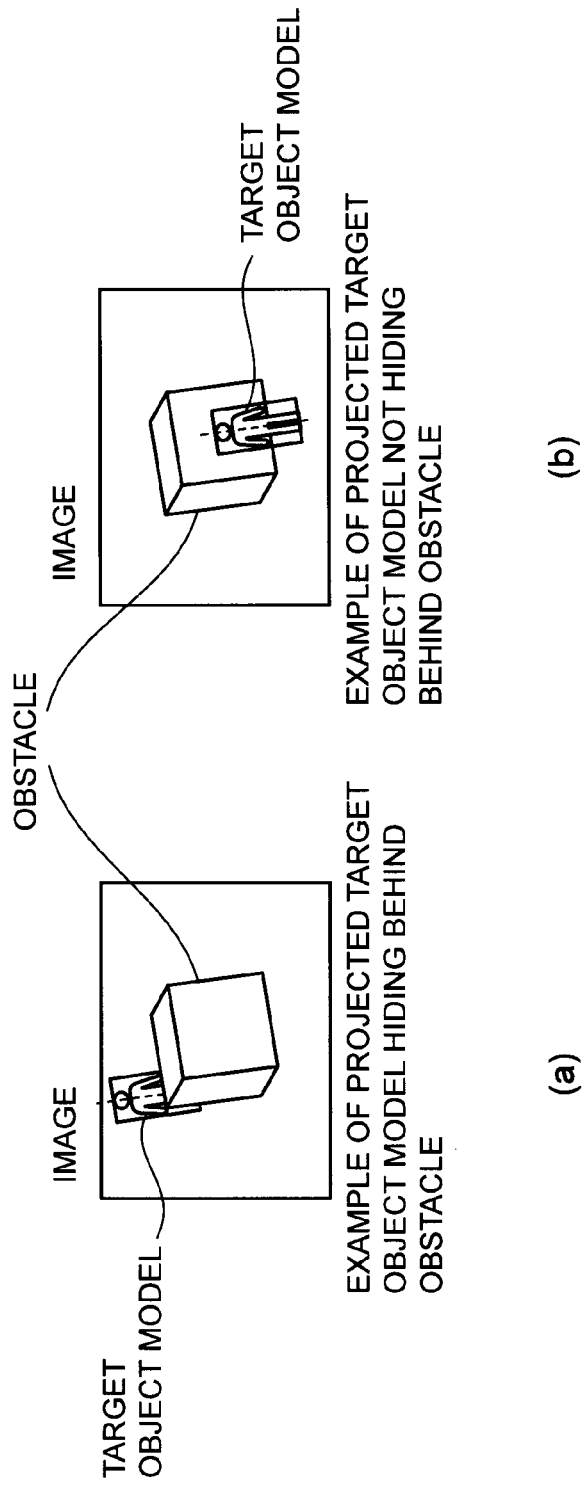
FIG. 20 It depicts an explanatory view illustrating examples where a target object model hides behind an obstacle and does not hide behind an obstacle in images.

FIG. 20 depicts an explanatory view illustrating examples where a target object model hides behind an obstacle and does not hide behind an obstacle in images. As illustrated in FIG. 20(a), a state in which even part of a target object model hides behind an obstacle in an image corresponds to a state in which the target object model hides behind the obstacle. Further, as illustrated in FIG. 20(b), a state in which no portion of the target object model hides behind the obstacle corresponds to a state in which the target object model does not hide behind the obstacle.

Processing process according to the third exemplary embodiment is the same as the flowchart illustrated in FIG. 12. Meanwhile, part of processing in steps S2, S3 and S4 differs from that in the first exemplary embodiment, and differences of the processing process according to the present exemplary embodiment will be mainly described with reference to the flowcharts in FIGS. 13 to 15. The same processing as processing which has already been described will not be described.

In step S202 illustrated in FIG. 13, the resolution evaluating means 215 determines a state in which a target object model is arranged at the position i in a selected target area, and an obstacle having a shape and a size stored in the obstacle memory means 36 is arranged at a position stored in the obstacle memory means 36. Subsequently, the resolution evaluating means 215 generates an image which represents this state, using the camera parameters (step S203).

In next step S205, the resolution evaluating means 215 evaluates whether or not part of the target object model protrudes outside an image and whether or not the target object model hides behind an obstacle. When part of the target object model protrudes outside the image or when the target object model hides behind the obstacle in the image, α takes value less than 1. Further, the resolution evaluating means 215 provides α=1 when the target object model fits in the image and the target object model does not hide behind an obstacle in the image.

In this case, the resolution evaluating means 215 may calculate, for example, a rate of a portion of the target object which fits in the image and which does not behind the obstacle, and determine α value of α based on this calculation result. Meanwhile, similar to the first exemplary embodiment, α takes a value in a range of 0 to 1.

The other processing in step S2 is the same as processing in step S2 according to the first exemplary embodiment.

Further, steps S302, S305 and S306 (see FIG. 14) executed by the gazing point angle evaluating means 216 according to the third exemplary embodiment are the same as steps S202, S203 and S205 executed by the above resolution evaluating means 215. Furthermore, the other processing in step S3 is the same as processing in step S3 according to the first exemplary embodiment.

Still further, steps S404 and S405 (see FIG. 15) executed by the target area evaluating means 217 according to the third exemplary embodiment are the same as steps S202 and S203 executed by the above resolution evaluating means 215. Moreover, the target area evaluating means 217 decides in step S406 whether or not the target object model fits in the image and the target object model does not hide behind the obstacle in the image. When the target object model fits in the image and the target object model does not hide behind the obstacle in the image (Yes in step S406), processing transitions to step S407. In other cases (No in step S406), processing subsequent to step S401 is repeated. Further, the other processing in step S4 is the same as processing in step S4 according to the first exemplary embodiment.

In the present exemplary embodiment, when suitability of image processing is comprehensively evaluated on camera parameters using resolution, a gazing point angle and the degree that a target area and a target object field-of-view area overlap, a decrease in the suitability of image processing caused when the target object hides behind the obstacle is taken into account. Consequently, when image processing is performed for an assumed target area, a target object and an obstacle, it is possible to provide to what degree camera parameters to be evaluated are suitable, as an evaluation index.

In addition, the second exemplary embodiment may be applied to the third exemplary embodiment.

Fourth Exemplary Embodiment

In the fourth exemplary embodiment, a data processing device does not have a gazing point angle evaluating means, a target area evaluating means and a comprehensive evaluating means. Further, in the fourth exemplary embodiment, the data processing device only needs to have a resolution evaluating means. Furthermore, the fourth exemplary embodiment differs from the first exemplary embodiment in data inputted to the resolution evaluating means. The resolution evaluating means according to the fourth exemplary embodiment will be assigned a reference numeral "218".

Figure 21:
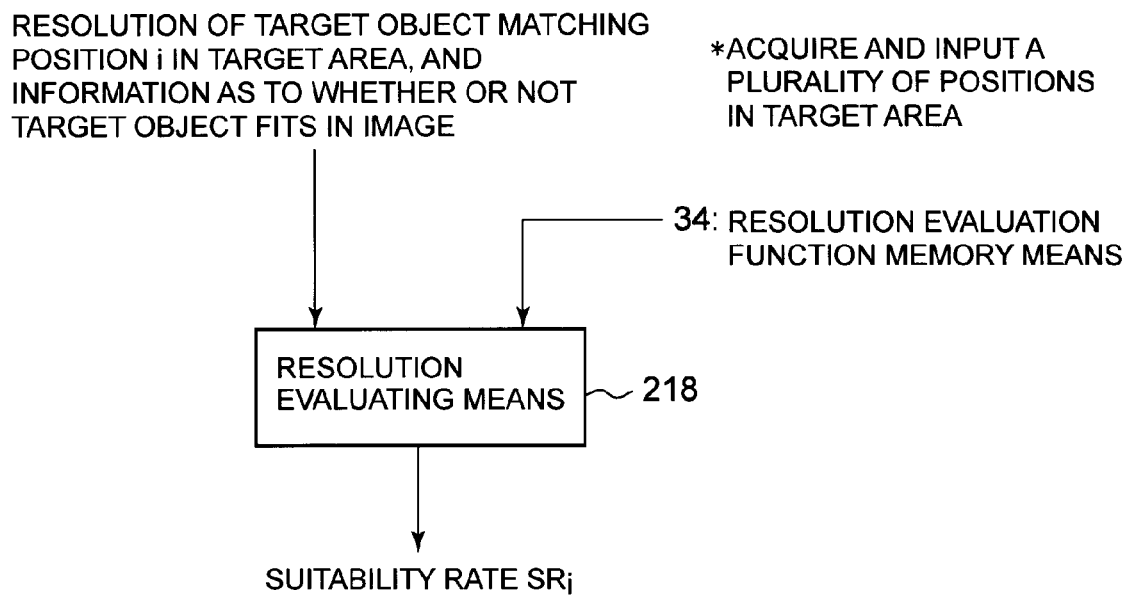
FIG. 21 It depicts an explanatory view illustrating data inputted to a resolution evaluating means 218 according to a fourth exemplary embodiment.

FIG. 21 depicts an explanatory view illustrating data inputted to the resolution evaluating means 218 according to the fourth exemplary embodiment. The resolution evaluating means 218 according to the fourth exemplary embodiment does not receive an input of camera parameters. Instead of the camera parameters, the resolution evaluating means 218 receives an input of resolution of a target object calculated from an image obtained when a camera actually captures the image of the target object in a target area, and information which indicates whether or not the entire target object fits in the image. When the entire target object does not fit in the image, a rate of a portion of the entire target object which fits in the image or the rate of a portion which protrudes outside the image may be inputted. A case will be described as an example where, when the target object does not fit in the image, a rate of a portion of the entire target object which fits in the image is inputted.

By changing an arrangement position of the target object in the target area, the camera captures an image of the target object in the target area under setting conditions such as a set position and posture per arrangement position of the target object. Further, resolution of the target object and information which indicates whether or not the target object fits in the image may be extracted from each image obtained per arrangement position of the target object as data inputted to the resolution evaluating means 218.

In the first exemplary embodiment, a state in which a target object model is arranged in a target area is determined, an image which represents this state is generated and resolution is acquired from this image. By contrast with this, in the present exemplary embodiment, resolution and information which indicates whether or not an entire target object fits in an image are, for example, manually acquired by an administrator from an image which is actually captured by the camera, and these pieces of information are inputted as data. Hence, in the fourth exemplary embodiment, an image size memory means 31, a target object model memory means 32 and a target area memory means 33 may not be provided. Further, a gazing point angle evaluation function memory means 35 may not also be provided. Meanwhile, a resolution evaluation function memory means 34 is provided in a storage device 3 (not illustrated in FIG. 21).

Hereinafter, an example of processing process according to the present exemplary embodiment will be described. The resolution evaluating means 218 receives an input of resolution of a target object calculated from an image obtained when a camera actually captures the image of the target object in a target area, and information which indicates whether or not the entire target object fits in the image per arrangement position of the target object. Further, when the entire target object does not fit in the image, a rate of a portion of the entire target object which fits in the image is also inputted to the resolution evaluating means 218. An operation of the resolution evaluating means 218 after these items of input data are inputted will be described with reference to FIG. 22.

Figure 22:
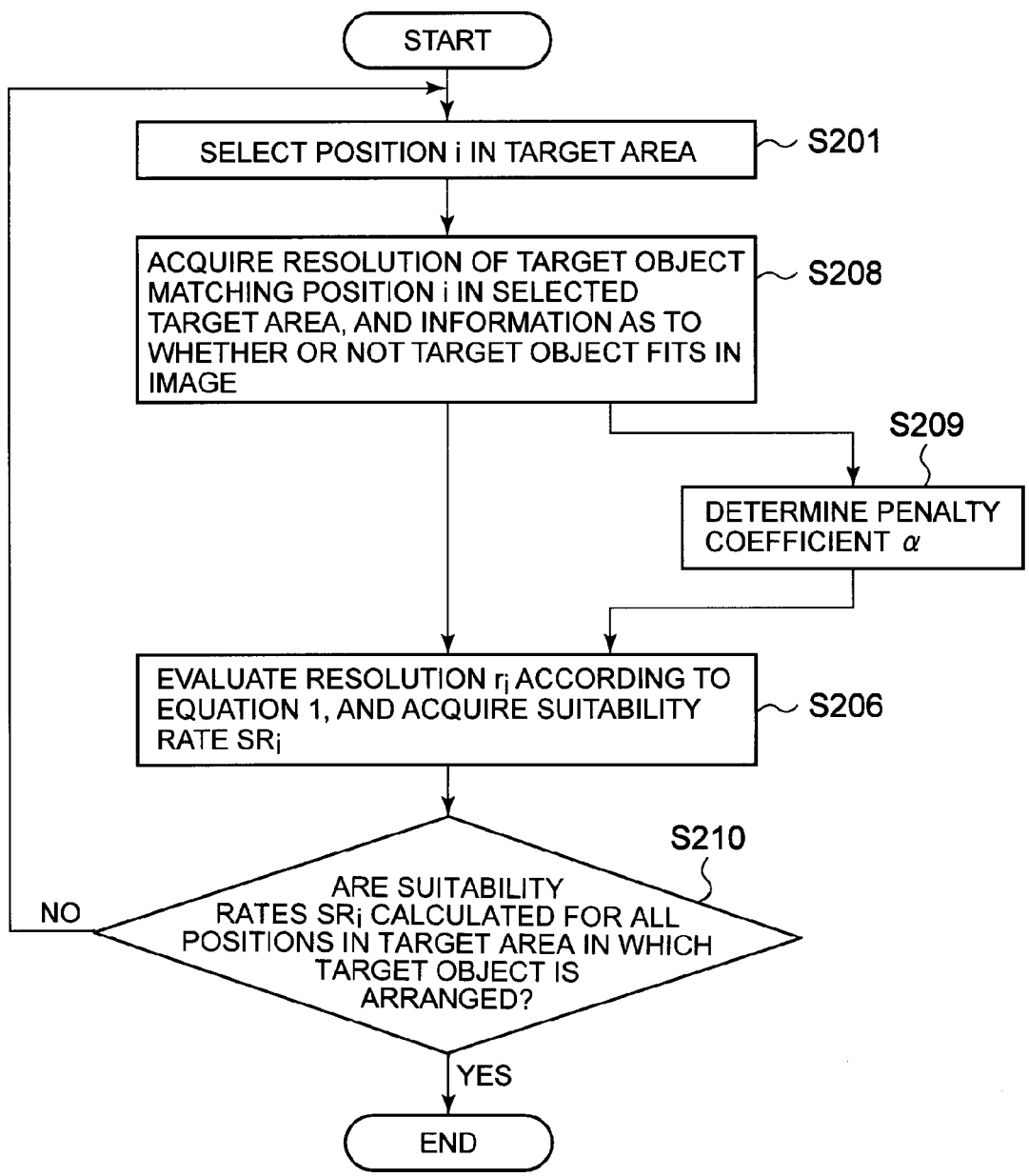
FIG. 22 It depicts a flowchart illustrating an example of an operation of a resolution evaluating means according to the fourth exemplary embodiment.

FIG. 22 depicts a flowchart illustrating an example of the operation of the resolution evaluating means 218 according to the fourth exemplary embodiment. The resolution evaluating means 218 selects a position i of a target area at which a target object is arranged and an image is captured (step S201).

Next, the resolution evaluating means 218 acquires inputted information matching the selected position i (step S208). That is, the resolution evaluating means 218 acquires resolution and information which matches the position i and indicates whether or not the entire target object fits in the image.

When the entire target object does not fit in the image, the resolution evaluating means 218 also acquires a rate of a portion of the entire target object which fits in the image.

Further, the resolution evaluating means 218 determines a penalty coefficient α based on whether or not the entire target object fits in the image and the rate of the portion of the entire target object which fits in the image (step S209). When the entire target object fits in the image, the resolution evaluating means 218 determines α=1. When this is not a case, the resolution evaluating means 218 determines α as a value less than 1. In this case, the resolution evaluating means 218 may determine α value of α according to the rate of the portion of the entire target object which fits in the image. Ways to determine α when a target object does not fit in the image are not limited in particular, and α may be determined according to the rate of the portion of the target object which protrudes outside the image. Meanwhile, α takes a value in a range of 0 to 1.

After steps S208 and 209, the resolution evaluating means 218 calculates the resolution rate $SR_i$ matching the selected position i by calculating equation (1) using the determined penalty coefficient α and the resolution evaluation function FR ($r_i$) (step S206). In the present exemplary embodiment, the resolution evaluating means 218 substitutes the resolution acquired in step S208 in equation (1).

Further, the resolution evaluating means 218 decides whether or not the suitability rates $SR_i$ are calculated for all positions of a target area at which a target object is arranged and an image is captured (step S210). When calculation of the suitability rate $SR_i$ for each position i is not completed (No in step S210), the resolution evaluating means 218 repeats processing subsequent to step S201. When calculation of the suitability rate $SR_i$ for each position i is completed (Yes in step S210), the resolution evaluating means 218 outputs the suitability rate $SR_i$ calculated for each position i, and finishes processing. The suitability rate $SR_i$ at each position i can also be utilized to evaluate image processing suitability related to resolution.

In the present exemplary embodiment, image processing suitability related to resolution can be evaluated based on an image obtained by actually capturing the image of the target object.

Fifth Exemplary Embodiment

Figure 23:
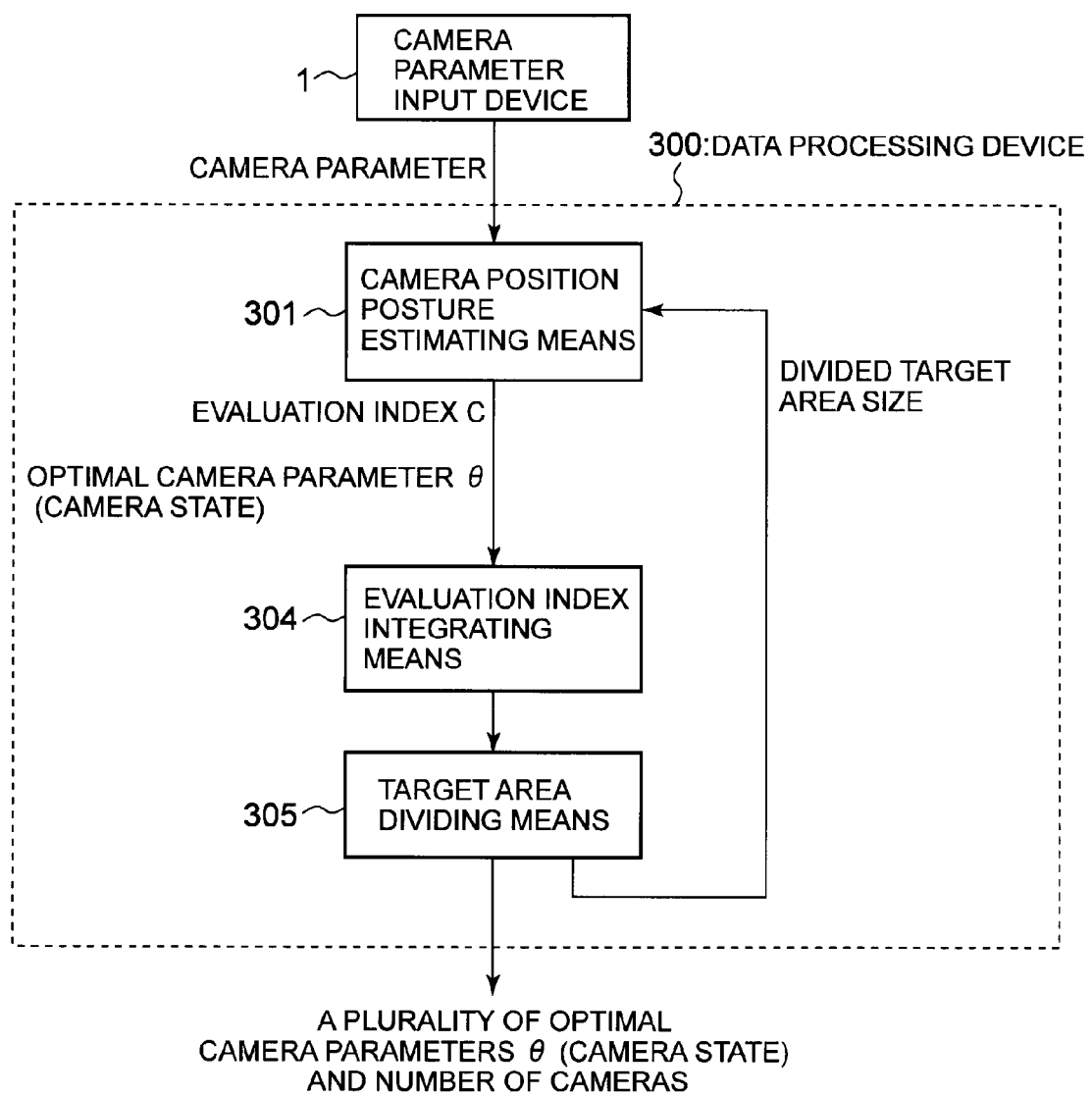
FIG. 23 It depicts a block diagram illustrating a configuration example of a camera position posture evaluating device according to a fifth exemplary embodiment of the present invention.

FIG. 23 depicts a block diagram illustrating a configuration example of a camera position posture evaluating device according to a fifth exemplary embodiment of the present invention. The camera position posture evaluating device according to the present exemplary embodiment has a camera parameter input device 1, a camera position posture estimating means 301, an evaluation index integrating means 304 and a target area dividing means 305.

The camera parameter input device 1 is the same as a camera parameter input device 1 according to the second exemplary embodiment.

Further, FIG. 23 illustrates a combination of a camera parameter switching means 22, an image processing suitability evaluating means 21, a camera parameter optimizing means 23 and a storage device 3 according to the second exemplary embodiment as a camera position posture estimating means 301. That is, the camera position posture estimating means 301 corresponds to the combination of the camera parameter switching means 22, the image processing suitability evaluating means 21, the camera parameter optimizing means 23 and the storage device 3 according to the second exemplary embodiment, and includes these means 21 to 23 and the storage device 3. Further, the camera position posture estimating means 301 performs the same processing as that of a data processing device 100 according to the second exemplary embodiment.

In the present exemplary embodiment, when an evaluation index C related to camera parameters optimized when the camera position posture estimating means 301 performs the same processing as that in the second exemplary embodiment is not a threshold or less, the target area dividing means 305 divides a target area. Further, it is assumed that a camera is arranged one by one in divided target areas, and the camera parameter input device 1 supplies the camera parameters to the camera position posture estimating means 301 per divided target area.

The camera position posture estimating means 301 calculates the optimized camera parameters and calculates the evaluation index C related to these camera parameters based on the inputted camera parameters per target area. Hence, the camera parameters and the evaluation index C are calculated to be associated with each divided target area on a one on one basis.

When the camera position posture estimating means 301 calculates for one area the optimal camera parameters and the evaluation index C related to the parameters, the camera parameter switching means 22, the image processing suitability evaluating means 21 and the camera parameter optimizing means 23 included in the camera position posture estimating means 301 perform the same processing as that in the second exemplary embodiment.

When an integration result (evaluation index C') of the evaluation index C calculated per divided area is not a threshold or less, the target area dividing means 305 further divides target areas and performs the same processing.

That the evaluation index C' which is an integration result is not the threshold or less means that camera parameters of a camera associated with divided areas on a one on one basis are not in a preferable state from a viewpoint that the camera parameters are suitable to image processing. In this case, the target area dividing means 305 increases the number of division of target areas. This corresponds to an assumption that the number of cameras is increased according to the number of division. Consequently, the camera position posture evaluating device according to the present exemplary embodiment searches for a state in which camera parameters of each camera become preferable by increasing the number of cameras when the camera parameters of cameras per area are not in a preferable state.

The evaluation index integrating means 304 integrates the evaluation index C calculated per divided target area. The integration result of the evaluation index C calculated per divided target area will be assigned "the reference numeral C'", and will be referred to as the "evaluation index C'".

Hereinafter, a method of calculating the integrated evaluation index C' will be described. The evaluation index C related to one area is represented by above equation (4). The evaluation index integrating means 304 adds all of the first term and the second term of equation (4) as is upon calculation of the evaluation index C per area. Further, the evaluation index integrating means 304 applies a weight to the third term of equation (4) at a rate of an area of a divided target area with respect to an area of the original target area, and adds the weighted third term. This addition result is the integrated evaluation index C'.

Hereinafter, a specific example of calculating the evaluation index C' will be described. It is assumed that the original target area is divided into three areas A, B and C. Further, the area of the original target area is n. Furthermore, the area of the area A is a. The area of the area B is b. The area of the area C is c.

An evaluation index $C_A$ related to a camera parameter of the area A is expressed by following equation (7).

[Formula 4]

$$C_A = W_1 \sum_{i=1}^{a/n} w_i^{(A)}(1-SR_i^{(A)})^2 + W_2 \sum_{i=1}^{a/n} w_i^{(A)}(1-SA_i^{(A)})^2 + W_3(1-ST^{(A)})^2 \quad \text{Equation (7)}$$

An evaluation index $C_B$ related to a camera parameter of the area B is expressed by following equation (8).

[Formula 5]

$$C_B = W_1 \sum_{i=1}^{b/n} w_i^{(B)}(1-SR_i^{(B)})^2 + W_2 \sum_{i=1}^{b/n} w_i^{(B)}(1-SA_i^{(B)})^2 + W_3(1-ST^{(B)})^2 \quad \text{Equation (8)}$$

An evaluation index $C_C$ related to a camera parameter of the area C is expressed by following equation (9).

[Formula 6]

$$C_C = W_1 \sum_{i=1}^{c/n} w_i^{(C)}(1-SR_i^{(A)})^2 + W_2 \sum_{i=1}^{c/n} w_i^{(C)}(1-SA_i^{(C)})^2 + W_3(1-ST^{(C)})^2 \quad \text{Equation (9)}$$

As described above, all of the first term and the second term are added as is, and a result obtained by applying a weight to the area of the divided area with respect to the original area is added to the third term. Hence, in this example, the evaluation index integrating means 304 calculates the integrated evaluation index C' by calculating following equation (10).

[Formula 7]

$$C' = W_1 \left( \sum_{i=1}^{a/n} w_i^{(A)}(1-SR_i^{(A)})^2 + \sum_{i=1}^{b/n} w_i^{(B)}(1-SR_i^{(B)})^2 + \sum_{i=1}^{c/n} w_i^{(C)}(1-SR_i^{(C)})^2 \right) +$$
$$W_2 \left( \sum_{i=1}^{a/n} w_i^{(A)}(1-SA_i^{(A)})^2 + \sum_{i=1}^{b/n} w_i^{(B)}(1-SA_i^{(B)})^2 + \sum_{i=1}^{c/n} w_i^{(C)}(1-SA_i^{(C)})^2 \right) +$$
$$W_3 \left( \frac{a}{n}(1-ST^{(A)})^2 + \frac{b}{n}(1-ST^{(B)})^2 + \frac{c}{n}(1-ST^{(C)})^2 \right) \quad \text{Equation (10)}$$

By calculating the evaluation index C' in this way, it is possible to compare the evaluation indices C according to the same scale even when the number of division of the original target area increases, and it is not necessary to change a value of a threshold to be compared with the evaluation indices C' according to the scale.

In addition, in the initial state in which the original target area is not divided, the evaluation index C calculated in relation to one area becomes the integrated evaluation index C' as is.

The target area dividing means 305 compares the integrated evaluation index C' and the threshold, and, when the evaluation index C' is the threshold or less, outputs the optimized camera parameters calculated for each divided area and the number of divided areas (in other words, the number of cameras). When the evaluation index C' is higher than the threshold, the number of division of the target areas is further increased. Further, the target area dividing means 305 inputs information of each divided area to the camera position estimating means 301, and has the camera position estimating means 301 execute processing of calculating the optimal camera parameter and the evaluation index C related to this camera parameter per area. In this case, the camera parameter input device 1 supplies default camera parameters to the camera position estimating means 301 per area.

When the camera position estimating means 301 calculates the evaluation index C per area, the evaluation index integrating means 304 calculates the evaluation index C' which is a result obtained by integrating the evaluation index C per area.

The camera position posture evaluating device according to the fifth exemplary embodiment repeats the above processing until the evaluation index C' becomes the threshold or less.

A mode of the target area dividing means 305 of dividing a target area is not limited in particular. When, for example, dividing the original target area into two and next dividing the target areas, the target area dividing means 305 may divide one of the two areas into two, further divide the other area into two and, subsequently, perform division in the same way.

According to the present exemplary embodiment, when an optimal camera parameter which satisfies an evaluation index cannot be obtained, it is possible to calculate the optimal camera parameter from which a preferable evaluation index can be obtained, and the number of cameras by increasing the number of cameras (the number of divided areas).

The third exemplary embodiment may be applied to the camera position posture estimating means 301 according to the fifth exemplary embodiment.

Sixth Exemplary Embodiment

Figure 24:
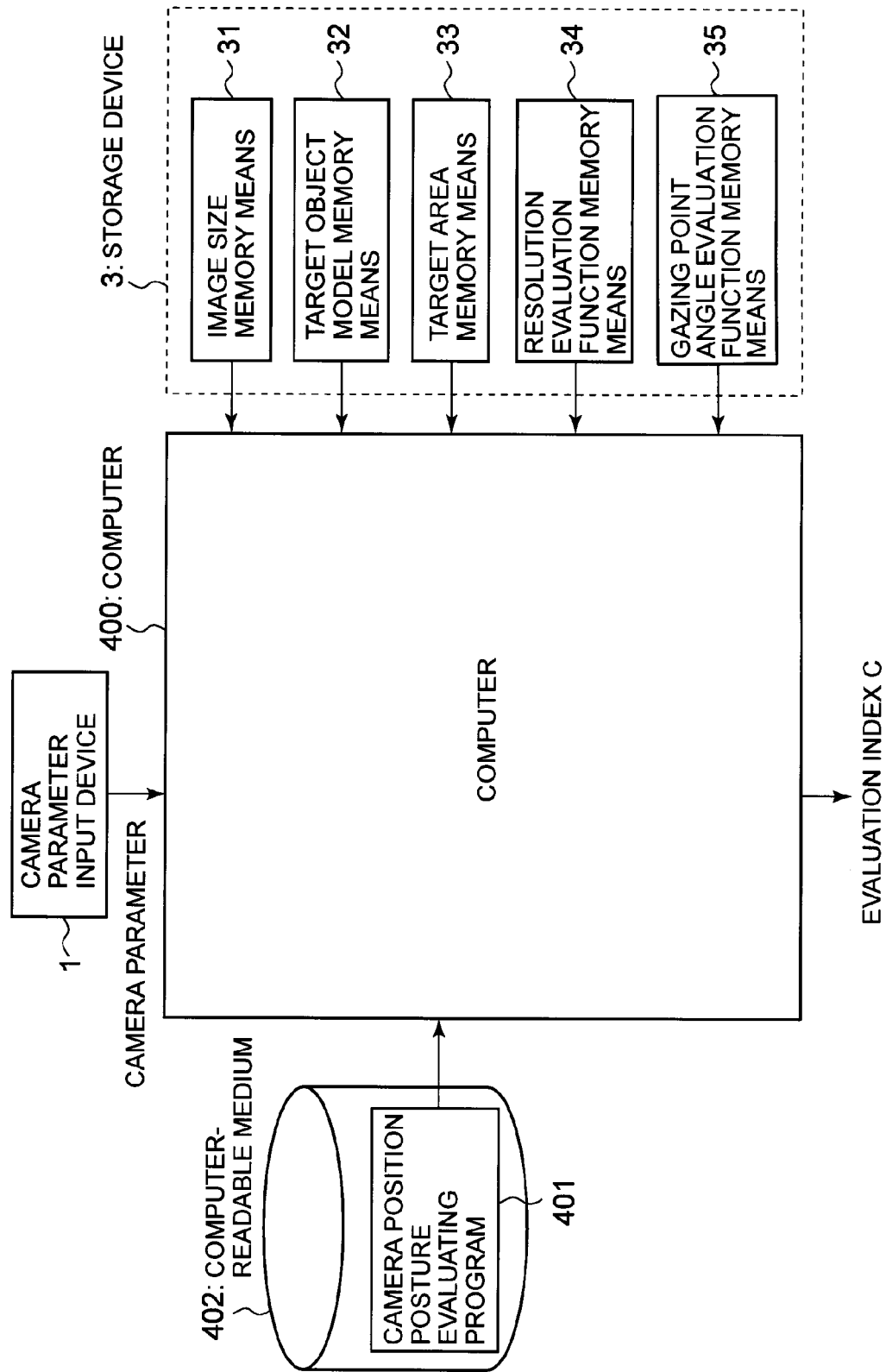
FIG. 24 It depicts a block diagram illustrating a configuration example of a camera position posture evaluating device according to a sixth exemplary embodiment of the present invention.

FIG. 24 depicts a block diagram illustrating a configuration example of a camera position posture evaluating device according to a sixth exemplary embodiment of the present invention. The same components as those in the first exemplary embodiment will be assigned the same reference numerals as in FIG. 1, and will not be described in detail. In the sixth exemplary embodiment, a storage device 3 which has an image size memory means 31, a target object model memory means 32, a target area memory means 33, a resolution evaluation function memory means 34 and a gazing point angle evaluation function memory means 35, and a camera parameter input device 1 are connected to a computer 400. Further, a computer-readable recording medium 402 which stores a camera position posture evaluating program 401 is also connected to the computer 400.

The computer-readable recording medium 402 is realized by, for example, a magnetic disk or a semiconductor memory, and, upon activation, the computer 400 reads the camera position posture evaluating program 401, and operates as, for example, a data processing device 2 according to the first exemplary embodiment (an image processing suitability evaluating means 21 which has a resolution evaluating means 211, a gazing point angle evaluating means 212, a target area evaluating means 213 and a comprehensive evaluating means 214) according to this program 401.

Further, the computer 400 may operate as a data processing device in each of the second to fifth exemplary embodiments according to the camera position posture evaluating program 401.

Furthermore, individual means may be realized by different units in the first to fifth exemplary embodiments.

Figure 25:
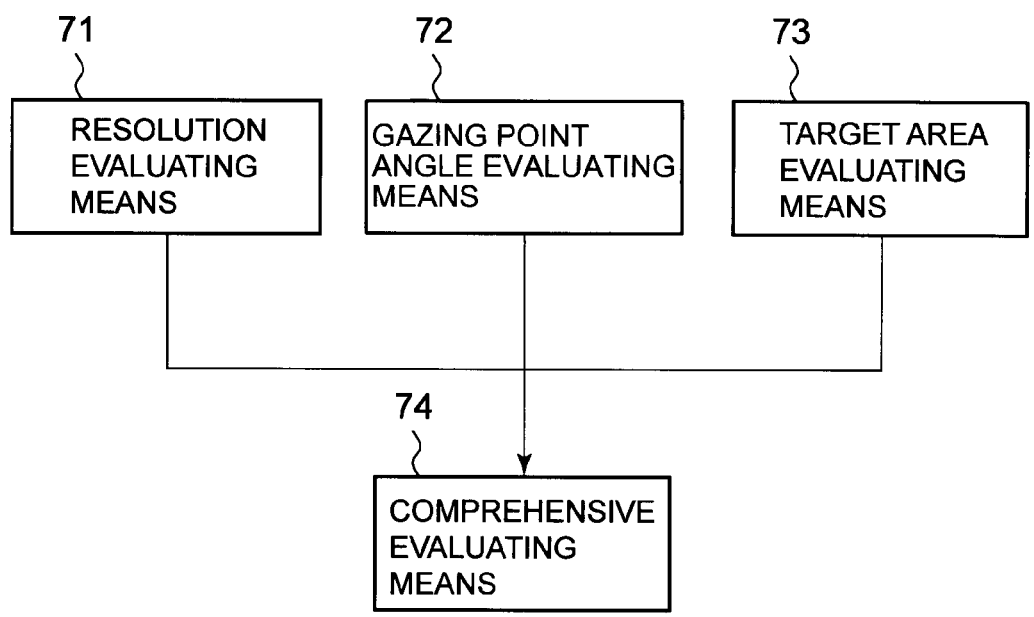
FIG. 25 It depicts a block diagram illustrating an example of a minimum configuration of a camera position posture evaluating device according to the present invention.

Next, a minimum configuration of the present invention will be described. FIG. 25 depicts a block diagram illustrating an example of a minimum configuration of a camera position posture evaluating device according to the present invention. The camera position posture evaluating device according to the present invention has at least one of a resolution evaluating means 71 and a gazing point angle evaluating means 72, and further has a target area evaluating means 73 and a comprehensive evaluating means 74.

The resolution evaluating means 71 evaluates resolution of a target object in an image obtained by capturing the image of the target object arranged at each position in a target area, according to a resolution evaluation function which defines a relationship between the resolution and a first suitability rate which indicates suitability of image processing, and thereby derives the first suitability rate (for example, $SR_i$) matching each position in the target area.

The gazing point angle evaluating means 72 evaluates a gazing point angle which is an angle formed between a straight line which passes on a gazing point in the target object arranged at each position in the target area and a position of a camera, and a ground according to a gazing point angle evaluation function which defines a relationship between the gazing point angle and a second suitability rate which indicates suitability of the image processing, and thereby derives the second suitability rate (for example, $SA_i$) matching each position in the target area.

The target area evaluating means 73 derives a third suitability rate (for example ST) which is determined based on to what degree a target object field-of-view area which is a collection of positions which are positions on the ground in real space which meet pixel positions in the image and in which the entirety of the target object fits in the image when the target object is arranged at the positions, and the target area accurately overlap, and which indicates the suitability of the image processing.

Based on at least one of the first suitability rate matching each position in the target area and the second suitability rate matching each position in the target area, and the third suitability rate, the comprehensive evaluating means 74 derives an evaluation index (for example, an evaluation index C) which indicates to what degree a state of the camera is suitable to the image processing.

According to this configuration, it is possible to calculate a value indicating an evaluation of a state of a camera from a viewpoint of to what degree an object appears in an image suitably to image processing.

Although part or entirety of the above exemplary embodiments can be disclosed as in the following supplementary notes, the exemplary embodiments are by no means limited to the following supplementary notes.

(Supplementary Note 1)

A camera position posture evaluating device has:

at least one of a resolution evaluating means which evaluates resolution of a target object in an image obtained by capturing the image of the target object arranged at each position in a target area, according to a resolution evaluation function which defines a relationship between the resolution and a first suitability rate which indicates suitability of image processing, and thereby derives the first suitability rate matching each position in the target area, and a gazing point angle evaluating means which evaluates a gazing point angle which is an angle formed between a straight line which passes on a gazing point in the target object arranged at each position in the target area and a position of a camera, and a ground according to a gazing point angle evaluation function which defines a relationship between the gazing point angle and a second suitability rate which indicates suitability of the image processing, and thereby derives the second suitability rate matching each position in the target area; a target area evaluating means which derives a third suitability rate which is determined based on to what degree a target object field-of-view area which is a collection of positions which are positions on the ground in real space which meet pixel positions in the image and in which the entirety of the target object fits in the image when the target object is arranged at the positions, and the target area accurately overlap, and which indicates the suitability of the image processing; and a comprehensive evaluating means which, based on at least one of the first suitability rate matching each position in the target area and the second suitability rate matching each position in the target area, and the third suitability rate, derives an evaluation index which indicates to what degree a state of the camera is suitable to the image processing.

(Supplementary Note 2)

The camera position posture evaluating device described in Supplementary note 1, further has the resolution evaluating means which evaluates the resolution of the target object in the image obtained by capturing the image of the target object arranged at each position in the target area according to the resolution evaluation function which defines the relationship between the resolution and the first suitability rate which indicates the suitability of the image processing, and thereby derives the first suitability rate matching each position in the target area, and the resolution evaluating means sets 1 to a value of a coefficient to multiply on a result obtained by evaluating the resolution according to the resolution evaluation function when the entirety of the target object fits in the image, sets a value equal to or more than 0 and less than 1 to the value of the coefficient when part of the target object does not fit in the image and multiplies with the coefficient the result obtained by evaluating the resolution according to the resolution evaluation function, and thereby derives the first suitability rate.

(Supplementary Note 3)

The camera position posture evaluating device described in Supplementary note 1, further has the resolution evaluating means which evaluates the resolution of the target object in the image obtained by capturing the image of the target object arranged at each position in the target area according to the resolution evaluation function which defines the relationship between the resolution and the first suitability rate which indicates suitability of the image processing, and thereby derives the first suitability rate matching each position in the target area, and the resolution evaluating means sets 1 to a value of a coefficient to multiply on a result obtained by evaluating the resolution according to the resolution evaluation function when the entirety of the target object fits in the image and the target object does not hide behind an obstacle, sets a value equal to or more than 0 and less than 1 to the value of the coefficient when part of the target object does not fit in the image or the target object hides behind the obstacle and multiplies with the coefficient the result obtained by evaluating the resolution according to the resolution evaluation function, and thereby derives the first suitability rate.

(Supplementary Note 4)

The camera position posture evaluating device described in any one of Supplementary notes 1 to 3, further has the gazing point angle evaluating means which evaluates the gazing point angle which is the angle formed between the straight line which passes on the gazing point in the target object arranged at each position in the target area and the position of the camera, and the ground according to the gazing point angle evaluation function which defines the relationship between the gazing point angle and the second suitability rate which indicates the suitability of the image processing, and thereby derives the second suitability rate matching each position in the target area, and the gazing point angle evaluating means sets 1 to a value of a coefficient to multiply on a result obtained by evaluating the gazing point angle according to the gazing point angle evaluation function when the entirety of the target object fits in the image, sets a value equal to or more than 0 and less than 1 to the value of the coefficient when part of the target object does not fit in the image and multiplies with the coefficient the result obtained by evaluating the gazing point angle according to the gazing point angle evaluation function, and thereby derives the second suitability rate.

(Supplementary Note 5)

The camera position posture evaluating device described in any one of Supplementary notes 1 to 3, further has the gazing point angle evaluating means which evaluates the gazing point angle which is the angle formed between the straight line which passes on the gazing point in the target object arranged at each position in the target area and the position of the camera, and the ground according to the gazing point angle evaluation function which defines the relationship between the gazing point angle and the second suitability rate which indicates the suitability of the image processing, and thereby derives the second suitability rate matching each position in the target area, and the gazing point angle evaluating means sets 1 to a value of a coefficient to multiply on a result obtained by evaluating the gazing point angle according to the gazing point angle evaluation function when the entirety of the target object fits in the image and the target object does not hide behind an obstacle, sets a value equal to or more than 0 and less than 1 to the value of the coefficient when part of the target object does not fit in the image or the target object hides behind the obstacle and multiplies with the coefficient the result obtained by evaluating the gazing point angle according to the gazing point angle evaluation function, and thereby derives the second suitability rate.

(Supplementary Note 6)

In the camera position posture evaluating device described in any one of Supplementary notes 1 to 5, the comprehensive evaluating means calculates a weighted sum of squares of a difference between an upper limit value of the first suitability rate and the first suitability rate using a weight at each position when the camera position posture evaluating device has the resolution evaluating means, calculates a weighted sum of squares of a difference between an upper limit value of the second suitability rate and the second suitability rate using the weight at each position when the camera position posture evaluating device has the gazing point angle evaluating means, calculates a sum of squares of a difference between an upper limit value of the third suitability rate and the third suitability rate, and calculates a weighted linear sum of each of the calculated sum of squares, and thereby calculates the evaluation index.

(Supplementary Note 7)

The camera position posture evaluating device described in any one of Supplementary notes 1 to 6, further has a parameter updating means which updates a camera parameter which represents the state of the camera such that the evaluation index derived by the comprehensive evaluating means is close to a predetermined value, and the parameter updating means calculates an optimal value of the camera parameter by updating the camera parameter every time the evaluation index is derived until the evaluation index satisfies a predetermined condition.

(Supplementary Note 8)

The camera position posture evaluating device described in Supplementary note 7, further has a target area dividing means which divides the target area, and the resolution evaluating means derives the first suitability rate matching each position in the target area per target area when the camera position posture evaluating device has the resolution evaluating means, the gazing point angle evaluating means derives the second suitability rate matching each position in the target area per target area when the camera position posture evaluating device has the gazing point angle evaluating means, the gazing point angle evaluating means derives the third suitability rate per target area, the comprehensive evaluating means derives the evaluation index per target area, the parameter updating means calculates the optimal value of the camera parameter per target area, the camera position posture evaluating device further has an evaluation index integrating means which integrates an evaluation index when the camera parameter in each target area becomes the optimal value, and the target area dividing means increases the number of division of the target area when the integrated evaluation index exceeds a threshold.

(Supplementary Note 9)

A camera position posture evaluating device has a resolution evaluating means which is given resolution of a target object in an image acquired from the image obtained by capturing the image of the target object arranged at each position in a target area and information which indicates whether or not entirety of the target object fits in the image, evaluates the resolution according to a resolution evaluation function which defines a relationship between the resolution and a suitability rate which indicates suitability of image processing, and thereby derives the suitability rate matching each position in the target area, and the resolution evaluating means sets 1 to a value of a coefficient to multiply on a result obtained by evaluating the resolution according to the resolution evaluation function when the entirety of the target object fits in the image, sets a value equal to or more than 0 and less than 1 to the value of the coefficient when part of the target object does not fit in the image and multiplies with the coefficient the result obtained by evaluating the resolution according to the resolution evaluation function, and thereby derives the suitability rate.

(Supplementary Note 10)

A camera position posture evaluating method includes: at least one of a resolution evaluating step of evaluating resolution of a target object in an image obtained by capturing the image of the target object arranged at each position in a target area, according to a resolution evaluation function which defines a relationship between the resolution and a first suitability rate which indicates suitability of image processing, and thereby deriving the first suitability rate matching each position in the target area, and a gazing point angle evaluating step of evaluating a gazing point angle which is an angle formed between a straight line which passes on a gazing point in the target object arranged at each position in the target area and a position of a camera, and a ground according to a gazing point angle evaluation function which defines a relationship between the gazing point angle and a second suitability rate which indicates suitability of the image processing, and thereby deriving the second suitability rate matching each position in the target area; a target area evaluating step of deriving a third suitability rate which is determined based on to what degree a target object field-of-view area which is a collection of positions which are positions on the ground in real space which meet pixel positions in the image and in which the entirety of the target object fits in the image when the target object is arranged at the positions, and the target area accurately overlap, and which indicates the suitability of the image processing; and a comprehensive evaluating step of, based on at least one of the first suitability rate matching each position in the target area and the second suitability rate matching each position in the target area, and the third suitability rate, deriving an evaluation index which indicates to what degree a state of the camera is suitable to the image processing.

(Supplementary Note 11)

The camera position posture evaluating method described in Supplementary note 10, further includes the resolution evaluating step of evaluating the resolution of the target object in the image obtained by capturing the image of the target object arranged at each position in the target area, according to the resolution evaluation function which defines the relationship between the resolution and the first suitability rate which indicates the suitability of the image processing, and thereby deriving the first suitability rate matching each position in the target area, and the resolution evaluating step includes setting 1 to a value of a coefficient to multiply on a result obtained by evaluating the resolution according to the resolution evaluation function when the entirety of the target object fits in the image, setting a value equal to or more than 0 and less than 1 to the value of the coefficient when part of the target object does not fit in the image and multiplying with the coefficient the result obtained by evaluating the resolution according to the resolution evaluation function, and thereby deriving the first suitability rate.

(Supplementary Note 12)

The camera position posture evaluating method described in Supplementary note 10, further includes the resolution evaluating step of evaluating the resolution of the target object in the image obtained by capturing the image of the target object arranged at each position in the target area, according to the resolution evaluation function which defines the relationship between the resolution and the first suitability rate which indicates the suitability of the image processing, and thereby deriving the first suitability rate matching each position in the target area, and the resolution evaluating step includes setting 1 to a value of a coefficient to multiply on a result obtained by evaluating the resolution according to the resolution evaluation function when the entirety of the target object fits in the image and the target object does not hide behind an obstacle, setting a value equal to or more than 0 and less than 1 to the value of the coefficient when part of the target object does not fit in the image or the target object hides behind the obstacle and multiplying with the coefficient the result obtained by evaluating the resolution according to the resolution evaluation function, and thereby deriving the first suitability rate.

(Supplementary Note 13)

The camera position posture evaluating method described in any one of Supplementary notes 10 to 12, further includes the gazing point angle evaluating step of evaluating the gazing point angle which is the angle formed between the straight line which passes on the gazing point in the target object arranged at each position in the target area and the position of the camera, and the ground according to the gazing point angle evaluation function which defines the relationship between the gazing point angle and the second suitability rate which indicates the suitability of the image processing, and thereby deriving the second suitability rate matching each position in the target area, and the gazing point angle evaluating step includes setting 1 to a value of a coefficient to multiply on a result obtained by evaluating the gazing point angle according to the gazing point angle evaluation function when the entirety of the target object fits in the image, setting a value equal to or more than 0 and less than 1 to the value of the coefficient when part of the target object does not fit in the image and multiplying with the coefficient the result obtained by evaluating the gazing point angle according to the gazing point angle evaluation function, and thereby deriving the second suitability rate.

(Supplementary Note 14)

The camera position posture evaluating method described in any one of Supplementary notes 10 to 12, further includes the gazing point angle evaluating step of evaluating the gazing point angle which is the angle formed between the straight line which passes on the gazing point in the target object arranged at each position in the target area and the position of the camera, and the ground according to the gazing point angle evaluation function which defines the relationship between the gazing point angle and the second suitability rate which indicates the suitability of the image processing, and thereby deriving the second suitability rate matching each position in the target area, and the gazing point angle evaluating step includes setting 1 to a value of a coefficient to multiply on a result obtained by evaluating the gazing point angle according to the gazing point angle evaluation function when the entirety of the target object fits in the image and the target object does not hide behind an obstacle, setting a value equal to or more than 0 and less than 1 to the value of the coefficient when part of the target object does not fit in the image or the target object hides behind the obstacle and multiplying with the coefficient the result obtained by evaluating the gazing point angle according to the gazing point angle evaluation function, and thereby deriving the second suitability rate.

(Supplementary Note 15)

In the camera position posture evaluating method described in any one of Supplementary notes 10 to 14, the comprehensive evaluating step includes calculating a weighted sum of squares of a difference between an upper limit value of the first suitability rate and the first suitability rate using a weight at each position when the camera position posture evaluating method includes the resolution evaluating step, the comprehensive evaluating step includes calculating a weighted sum of squares of a difference between an upper limit value of the second suitability rate and the second suitability rate using the weight at each position when the camera position posture evaluating method includes the gazing point angle evaluating step, and the comprehensive evaluating step includes calculating a sum of squares of a difference between an upper limit value of the third suitability rate and the third suitability rate and calculating a weighted linear sum of each of the calculated sum of squares, and thereby deriving the evaluation index.

(Supplementary Note 16)

The camera position posture evaluating method described in any one of Supplementary notes 10 to 15, further includes a parameter updating step of updating a camera parameter which represents the state of the camera such that the evaluation index derived in the comprehensive evaluating step is close to a predetermined value, and the parameter updating step includes calculating an optimal value of the camera parameter by updating the camera parameter every time the evaluation index is derived until the evaluation index satisfies a predetermined condition.

(Supplementary Note 17)

The camera position posture evaluating method described in Supplementary note 16, further includes a target area dividing step of dividing a target area, and the resolution evaluating step includes deriving the first suitability rate matching each position in the target area per target area when the camera position posture evaluating method includes the resolution evaluating step, the gazing point angle evaluating step includes deriving the second suitability rate matching each position in the target area per target area when the camera position posture evaluating method includes the gazing point angle evaluating step, the gazing point angle evaluating step includes deriving the third suitability rate per target area, the comprehensive evaluating step includes deriving the evaluation index per target area, the parameter updating step includes calculating the optimal value of the camera parameter per target area, the camera position posture evaluating method further includes an evaluation index integrating step of integrating an evaluation index when the camera parameter in each target area becomes the optimal value, and the target area dividing step includes increasing the number of division of the target area when the integrated evaluation index exceeds a threshold.

(Supplementary Note 18)

A camera position posture evaluating method includes a resolution evaluating step of being given resolution of a target object in an image acquired from the image obtained by capturing the image of the target object arranged at each position in a target area and information which indicates whether or not entirety of the target object fits in the image, evaluating the resolution according to a resolution evaluation function which defines a relationship between the resolution and a suitability rate which indicates suitability of image processing, and thereby deriving the suitability rate matching each position in the target area, and the resolution evaluating step includes setting 1 to a value of a coefficient to multiply on a result obtained by evaluating the resolution according to the resolution evaluation function when the entirety of the target object fits in the image, setting a value equal to or more than 0 and less than 1 to the value of the coefficient when part of the target object does not fit in the image and multiplying with the coefficient the result obtained by evaluating the resolution according to the resolution evaluation function, and thereby deriving the suitability rate.

(Supplementary Note 19)

A camera position posture evaluating program causes a computer to execute: at least one of resolution evaluation processing of evaluating resolution of a target object in an image obtained by capturing the image of the target object arranged at each position in a target area, according to a resolution evaluation function which defines a relationship between the resolution and a first suitability rate which indicates suitability of image processing, and thereby deriving the first suitability rate matching each position in the target area, and gazing point angle evaluation processing of evaluating a gazing point angle which is an angle formed between a straight line which passes on a gazing point in the target object arranged at each position in the target area and a position of a camera, and a ground according to a gazing point angle evaluation function which defines a relationship between the gazing point angle and a second suitability rate which indicates suitability of the image processing, and thereby deriving the second suitability rate matching each position in the target area; target area evaluation processing of deriving a third suitability rate which is determined based on to what degree a target object field-of-view area which is a collection of positions which are positions on the ground in real space which meet pixel positions in the image and in which the entirety of the target object fits in the image when the target object is arranged at the positions, and the target area accurately overlap, and which indicates the suitability of the image processing; and comprehensive evaluation processing of, based on at least one of the first suitability rate matching each position in the target area and the second suitability rate matching each position in the target area, and the third suitability rate, deriving an evaluation index which indicates to what degree a state of the camera is suitable to the image processing.

(Supplementary Note 20)

The camera position posture evaluating program described in Supplementary note 19, further causes the computer to execute the resolution evaluation processing of evaluating the resolution of the target object in the image obtained by capturing the image of the target object arranged at each position in the target area, according to the resolution evaluation function which defines the relationship between the resolution and the first suitability rate which indicates the suitability of the image processing, and thereby deriving the first suitability rate matching each position in the target area, and the computer is caused to in the resolution evaluation processing set 1 to a value of a coefficient to multiply on a result obtained by evaluating the resolution according to the resolution evaluation function when the entirety of the target object fits in the image, set a value equal to or more than 0 and less than 1 to the value of the coefficient when part of the target object does not fit in the image and multiply with the coefficient the result obtained by evaluating the resolution according to the resolution evaluation function, and thereby derive the first suitability rate.

(Supplementary Note 21)

The camera position posture evaluating program described in Supplementary note 19, further causes the computer to execute the resolution evaluation processing of evaluating the resolution of the target object in the image obtained by capturing the image of the target object arranged at each position in the target area, according to the resolution evaluation function which defines the relationship between the resolution and the first suitability rate which indicates the suitability of the image processing, and thereby deriving the first suitability rate matching each position in the target area, and the computer is caused to in the resolution evaluation processing set 1 to a value of a coefficient to multiply on a result obtained by evaluating the resolution according to the resolution evaluation function when the entirety of the target object fits in the image and the target object does not hide behind an obstacle, set a value equal to or more than 0 and less than 1 to the value of the coefficient when part of the target object does not fit in the image or the target object hides behind the obstacle and multiply with the coefficient the result obtained by evaluating the resolution according to the resolution evaluation function, and thereby derive the first suitability rate.

(Supplementary Note 22)

The camera position posture evaluating program described in one of Supplementary notes 19 to 21, further causes the computer to execute the gazing point angle evaluation processing of evaluating the gazing point angle which is the angle formed between the straight line which passes on the gazing point in the target object arranged at each position in the target area and the position of the camera, and the ground according to the gazing point angle evaluation function which defines the relationship between the gazing point angle and the second suitability rate which indicates the suitability of the image processing, and thereby deriving the second suitability rate matching each position in the target area, and the computer is caused to in the gazing point angle evaluation processing set 1 to a value of a coefficient to multiply on a result obtained by evaluating the gazing point angle according to the gazing point angle evaluation function when the entirety of the target object fits in the image, set a value equal to or more than 0 and less than 1 to the value of the coefficient when part of the target object does not fit in the image and multiply with the coefficient the result obtained by evaluating the gazing point angle according to the gazing point angle evaluation function, and thereby derive the second suitability rate.

(Supplementary Note 23)

The camera position posture evaluating program described in any one of Supplementary notes 19 to 21, further causes the computer to execute the gazing point angle evaluation processing of evaluating the gazing point angle which is the angle formed between the straight line which passes on the gazing point in the target object arranged at each position in the target area and the position of the camera, and the ground according to the gazing point angle evaluation function which defines the relationship between the gazing point angle and the second suitability rate which indicates the suitability of the image processing, and thereby deriving the second suitability rate matching each position in the target area, and the computer is caused to in the gazing point angle evaluation processing set 1 to a value of a coefficient to multiply on a result obtained by evaluating the gazing point angle according to the gazing point angle evaluation function when the entirety of the target object fits in the image and the target object does not hide behind an obstacle, set a value equal to or more than 0 and less than 1 to the value of the coefficient when part of the target object does not fit in the image or the target object hides behind the obstacle and multiply with the coefficient the result obtained by evaluating the gazing point angle according to the gazing point angle evaluation function, and thereby derive the second suitability rate.

(Supplementary Note 24)

In the camera position posture evaluating program described in any one of Supplementary notes 19 to 23, the computer is caused to in the comprehensive evaluation processing calculate a weighted sum of squares of a difference between an upper limit value of the first suitability rate and the first suitability rate using a weight at each position when the camera position posture evaluating program causes the computer to execute the resolution evaluation processing, the computer is caused to in the comprehensive evaluation processing calculate a weighted sum of squares of a difference between an upper limit value of the second suitability rate and the second suitability rate using the weight at each position when the camera position posture evaluating program causes the computer to execute the gazing point angle evaluation processing, and the computer is caused to in the comprehensive evaluation processing calculate a sum of squares of a difference between an upper limit value of the third suitability rate and the third suitability rate and calculate a weighted linear sum of each of the calculated sum of squares, and thereby derive the evaluation index.

(Supplementary Note 25)

The camera position posture evaluating program described in any one of Supplementary notes 19 to 24, further causes the computer to execute parameter update processing of updating a camera parameter which represents the state of the camera such that the evaluation index derived by the comprehensive evaluation processing is close to a predetermined value, and the computer is caused to in the parameter update processing calculate an optimal value of the camera parameter by updating the camera parameter every time the evaluation index is derived until the evaluation index satisfies a predetermined condition.

(Supplementary Note 26)

The camera position posture evaluating program described in Supplementary note 25, further causes the computer to execute target area dividing processing of dividing a target area, and the computer is caused to in the resolution evaluation processing derive the first suitability rate matching each position in the target area per target area when the camera position posture evaluating program causes the computer to execute the resolution evaluation processing, the computer is caused to in the gazing point angle evaluating processing derive the second suitability rate matching each position in the target area per target area when the camera position posture evaluating program causes the computer to execute the gazing point angle evaluation processing, the computer is caused to in the gazing point angle evaluation processing derive the third suitability rate per target area, the computer is caused to in the comprehensive evaluation processing derive the evaluation index per target area, the computer is caused to in the parameter update processing calculate the optimal value of the camera parameter per target area, the camera position posture evaluating program further causes the computer to execute evaluation index integration processing of integrating an evaluation index when the camera parameter in each target area becomes the optimal value, and the computer is caused to in the target area division processing increase the number of division of the target area when the integrated evaluation index exceeds a threshold.

(Supplementary Note 27)

A camera position posture evaluating program causes a computer to execute resolution evaluation processing of being given resolution of a target object in an image acquired from the image obtained by capturing the image of the target object arranged at each position in a target area and information which indicates whether or not entirety of the target object fits in the image, evaluating the resolution according to a resolution evaluation function which defines a relationship between the resolution and a suitability rate which indicates suitability of image processing, and thereby deriving the suitability rate matching each position in the target area, and the computer is caused to in the resolution evaluation processing set 1 to a value of a coefficient to multiply on a result obtained by evaluating the resolution according to the resolution evaluation function when the entirety of the target object fits in the image, set a value equal to or more than 0 and less than 1 to the value of the coefficient when part of the target object does not fit in the image and multiply with the coefficient the result obtained by evaluating the resolution according to the resolution evaluation function, and thereby derive the suitability rate.

This application claims priority to Japanese Patent Application No. 2012-145433 filed on Jun. 28, 2012, the entire contents of which are incorporated by reference herein.

Although the present invention has been described above with reference to the exemplary embodiments, the present invention is by no means limited to the above exemplary embodiments. The configurations and the details of the present invention can be variously changed within a scope of the present invention which one of ordinary skill in art can understand.

INDUSTRIAL APPLICABILITY

The present invention is suitably applied for use of evaluating a camera parameter of a camera which captures images of an assumed target area and a target object from a viewpoint of suitability of image processing. Further, the present invention can be used to install a camera for object detection, object position estimation, flow analysis or behavior analysis, or construct, support or consult with a surveillance system in fields such as surveillance, marketing and business improvement.

REFERENCE SIGNS LIST

1 Camera parameter input device
2,100,300 Data processing device 3, 102 Storage device
21, 24 Image processing suitability evaluating device
22 Camera parameter switching means
23 Camera parameter optimizing means
31 Image size memory means
32 Target object model memory means
33 Target area memory means
34 Resolution evaluation function memory means
35 Gazing point angle evaluation function memory means
36 Obstacle memory means
211, 215, 218 Resolution evaluating means
212, 216 Gazing point angle evaluating means
213, 217 Target area evaluating means
214 Comprehensive evaluating means
301 Camera position posture estimating means
304 Evaluation index integrating means
305 Target area dividing means

The invention claimed is:

1. A camera position posture evaluating device comprising: at least one of
- a resolution evaluating unit which evaluates resolution of a target object in an image obtained by capturing the image of the target object arranged at each position in a target area, according to a resolution evaluation function which defines a relationship between the resolution and a first suitability rate which indicates suitability of image processing, and thereby derives the first suitability rate matching each position in the target area, and
- a gazing point angle evaluating unit which evaluates a gazing point angle which is an angle formed between a straight line which passes on a gazing point in the target object arranged at each position in the target area and a position of a camera, and a ground according to a gazing point angle evaluation function which defines a relationship between the gazing point angle and a second suitability rate which indicates suitability of the image processing, and thereby derives the second suitability rate matching each position in the target area;
- a target area evaluating unit which derives a third suitability rate which is determined based on to what degree a target object field-of-view area which is a collection of positions which are positions on the ground in real space which meet pixel positions in the image and in which the entirety of the target object fits in the image when the target object is arranged at the positions, and the target area accurately overlap, and which indicates the suitability of the image processing; and
- a comprehensive evaluating unit which, based on at least one of the first suitability rate matching each position in the target area and the second suitability rate matching each position in the target area, and the third suitability rate, derives an evaluation index which indicates to what degree a state of the camera is suitable to the image processing.

2. The camera position posture evaluating device according to claim 1, further comprising the resolution evaluating unit which evaluates the resolution of the target object in the image obtained by capturing the image of the target object arranged at each position in the target area according to the resolution evaluation function which defines a relationship between the resolution and the first suitability rate which indicates suitability of the image processing, and thereby derives the first suitability rate matching each position in the target area,
wherein the resolution evaluating unit sets 1 to a value of a coefficient to multiply on a result obtained by evaluating the resolution according to the resolution evaluation function when the entirety of the target object fits in the image, sets a value equal to or more than 0 and less than 1 to the value of the coefficient when part of the target object does not fit in the image and multiplies with the coefficient the result obtained by evaluating the resolution according to the resolution evaluation function, and thereby derives the first suitability rate.

3. The camera position posture evaluating device according to claim 1, further comprising the resolution evaluating unit which evaluates the resolution of the target object in the image obtained by capturing the image of the target object arranged at each position in the target area according to the resolution evaluation function which defines a relationship between the resolution and the first suitability rate which indicates suitability of the image processing, and thereby derives the first suitability rate matching each position in the target area,
wherein the resolution evaluating unit sets 1 to a value of a coefficient to multiply on a result obtained by evaluating the resolution according to the resolution evaluation function when the entirety of the target object fits in the image and the target object does not hide behind an obstacle, sets a value equal to or more than 0 and less than 1 to the value of the coefficient when part of the target object does not fit in the image or the target object hides behind the obstacle and multiplies with the coefficient the result obtained by evaluating the resolution according to the resolution evaluation function, and thereby derives the first suitability rate.

4. The camera position posture evaluating device according to claim 1, further comprising the gazing point angle evaluating unit which evaluates the gazing point angle which is the angle formed between the straight line which passes on the gazing point in the target object arranged at each position in the target area and the position of the camera, and the ground according to the gazing point angle evaluation function which defines the relationship between the gazing point angle and the second suitability rate which indicates the suitability of the image processing, and thereby derives the second suitability rate matching each position in the target area,
wherein the gazing point angle evaluating unit sets 1 to a value of a coefficient to multiply on a result obtained by evaluating the gazing point angle according to the gazing point angle evaluation function when the entirety of the target object fits in the image, sets a value equal to or more than 0 and less than 1 to the value of the coefficient when part of the target object does not fit in the image and multiplies with the coefficient the result obtained by evaluating the gazing point angle according to the gazing point angle evaluation function, and thereby derives the second suitability rate.

5. The camera position posture evaluating device according to claim 1, further comprising the gazing point angle evaluating unit which evaluates the gazing point angle which is the angle formed between the straight line which passes on the gazing point in the target object arranged at each position in the target area and the position of the camera, and the ground according to the gazing point angle evaluation function which defines the relationship between the gazing point angle and the second suitability rate which indicates the suitability of the image processing, and thereby derives the second suitability rate matching each position in the target area,
wherein the gazing point angle evaluating unit sets 1 to a value of a coefficient to multiply on a result obtained by evaluating the gazing point angle according to the gazing point angle evaluation function when the entirety of the target object fits in the image and the target object does not hide behind an obstacle, sets a value equal to or more than 0 and less than 1 to the value of the coefficient when part of the target object does not fit in the image or the target object hides behind the obstacle and multiplies with the coefficient the result obtained by evaluating the gazing point angle according to the gazing point angle evaluation function, and thereby derives the second suitability rate.

6. The camera position posture evaluating device according to claim 1, wherein a comprehensive evaluating unit
calculates a weighted sum of squares of a difference between an upper limit value of the first suitability rate and the first suitability rate using a weight at each position when the camera position posture evaluating device comprises the resolution evaluating unit,
calculates a weighted sum of squares of a difference between an upper limit value of the second suitability rate and the second suitability rate using the weight at each position when the camera position posture evaluating device comprises the gazing point angle evaluating unit,
calculates a sum of squares of a difference between an upper limit value of the third suitability rate and the third suitability rate, and
calculates a weighted linear sum of each of the calculated sum of squares, and thereby calculates the evaluation index.

7. The camera position posture evaluating device according to claim 1, further comprising a parameter updating unit which updates a camera parameter which represents the state of the camera such that the evaluation index derived by the comprehensive evaluating unit is close to a predetermined value,
wherein the parameter updating unit calculates an optimal value of the camera parameter by updating the camera parameter every time the evaluation index is derived until the evaluation index satisfies a predetermined condition.

8. A camera position posture evaluating device comprising a resolution evaluating unit which is given resolution of a target object in an image acquired from the image obtained by capturing the image of the target object arranged at each position in a target area and information which indicates whether or not entirety of the target object fits in the image, evaluates the resolution according to a resolution evaluation function which defines a relationship between the resolution and a suitability rate which indicates suitability of image processing, and thereby derives the suitability rate matching each position in the target area,
wherein the resolution evaluating unit sets 1 to a value of a coefficient to multiply on a result obtained by evaluating the resolution according to the resolution evaluation function when the entirety of the target object fits in the image, sets a value equal to or more than 0 and less than 1 to the value of the coefficient when part of the target object does not fit in the image and multiplies with the coefficient the result obtained by evaluating the resolution according to the resolution evaluation function, and thereby derives the suitability rate.

9. A camera position posture evaluating method comprising: at least one of
a resolution evaluating step of evaluating resolution of a target object in an image acquired from the image obtained by capturing the image of the target object arranged at each position in a target area, according to a resolution evaluation function which defines a relationship between the resolution and a first suitability rate which indicates suitability of image processing, and thereby deriving the first suitability rate matching each position in the target area, and
a gazing point angle evaluating step of evaluating a gazing point angle which is an angle formed between a straight line which passes on a gazing point in the target object arranged at each position in the target area and a position of a camera, and a ground according to a gazing point angle evaluation function which defines a relationship between the gazing point angle and a second suitability rate which indicates suitability of the image processing, and thereby deriving the second suitability rate matching each position in the target area;
a target area evaluating step of deriving a third suitability rate which is determined based on to what degree a target object field-of-view area which is a collection of positions which are positions on the ground in real space which meet pixel positions in the image and in which the entirety of the target object fits in the image when the target object is arranged at the positions, and the target area accurately overlap, and which indicates the suitability of the image processing; and
a comprehensive evaluating step of, based on at least one of the first suitability rate matching each position in the target area and the second suitability rate matching each position in the target area, and the third suitability rate, deriving an evaluation index which indicates to what degree a state of the camera is suitable to the image processing.

* * * * *